United States Patent
Kobayashi et al.

(10) Patent No.: US 7,245,430 B2
(45) Date of Patent: Jul. 17, 2007

(54) METHOD AND APPARATUS FOR DISPLAYING THREE-DIMENSIONAL STEREO IMAGE USING LIGHT DEFLECTOR

(75) Inventors: Masanori Kobayashi, Kanagawa (JP); Toshiaki Tokita, Kanagawa (JP); Yumi Matsuki, Kanagawa (JP); Hiroyuki Sugimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/825,317

(22) Filed: Apr. 16, 2004

(65) Prior Publication Data

US 2004/0263968 A1 Dec. 30, 2004

(30) Foreign Application Priority Data

Apr. 21, 2003 (JP) .............................. 2003-115766
Feb. 6, 2004 (JP) .............................. 2004-031072

(51) Int. Cl.
*G02B 27/22* (2006.01)
*H04N 13/04* (2006.01)

(52) U.S. Cl. ...................... 359/464; 359/462; 359/463; 348/51; 348/55

(58) Field of Classification Search ................ 359/462, 359/463, 15, 23, 19, 464; 348/54, 55, 56, 348/59, 51
See application file for complete search history.

(56) References Cited

U.S. PATENT DOCUMENTS

| 5,044,733 A | 9/1991 | Kamoi et al. |
| 5,103,422 A | 4/1992 | Tokita et al. |
| 5,323,366 A | 6/1994 | Watada et al. |
| 5,337,293 A | 8/1994 | Tokita et al. |
| 5,369,629 A | 11/1994 | Watada et al. |
| 5,420,833 A | 5/1995 | Tanaka et al. |
| 5,430,696 A | 7/1995 | Tokita et al. |
| 5,459,701 A | 10/1995 | Tokita et al. |
| 5,487,046 A | 1/1996 | Watada et al. |
| 5,496,497 A | 3/1996 | Takiguchi et al. |
| 5,510,886 A | 4/1996 | Sugimoto et al. |
| 5,513,026 A | 4/1996 | Suzuki et al. |
| 5,566,013 A | 10/1996 | Suzuki et al. |
| 5,619,765 A | 4/1997 | Tokita et al. |
| 5,638,842 A | 6/1997 | Tokita et al. |
| 5,643,380 A | 7/1997 | Saitoh et al. |

(Continued)

FOREIGN PATENT DOCUMENTS

JP 53-80114 7/1978

(Continued)

*Primary Examiner*—Audrey Chang
(74) *Attorney, Agent, or Firm*—Oblon, Spivak, McClelland, Maier & Neustadt, P.C.

(57) ABSTRACT

In a method for displaying a three-dimensional stereo image, a left-eye image defined by multiple left-eye strip pixels and a right-eye image defined by multiple right-eye strip pixels are displayed such that the left-eye pixels and the right-eye pixels are arranged alternately from the left to the right in a width direction. The left-eye image and the right-eye image are guided separately to the left eye and the right eye of an observer. Then, the left-eye image and the right-eye image are shifted by one pixel in an oscillating manner, and the left-eye image and the right-eye image are deflected synchronized with the one-pixel shifting operation.

9 Claims, 30 Drawing Sheets

U.S. PATENT DOCUMENTS

| | | |
|---|---|---|
| 5,736,265 A | 4/1998 | Tanaka et al. |
| 5,769,957 A | 6/1998 | Murakami et al. |
| 5,923,928 A | 7/1999 | Sugimoto |
| 5,926,669 A | 7/1999 | Sugimoto et al. |
| 5,966,167 A * | 10/1999 | Nose et al. .................... 348/59 |
| 6,006,062 A | 12/1999 | Takahashi et al. |
| 6,101,008 A * | 8/2000 | Popovich .................... 359/15 |
| 6,157,795 A | 12/2000 | Kadonaga et al. |
| 6,223,008 B1 | 4/2001 | Takahashi et al. |
| 6,229,561 B1 * | 5/2001 | Son et al. .................... 348/42 |
| 6,524,759 B1 | 2/2003 | Sugimoto et al. |
| 6,537,711 B1 | 3/2003 | Nimura et al. |
| 6,611,243 B1 * | 8/2003 | Moseley et al. ............... 345/4 |
| 2003/0098945 A1 | 5/2003 | Sugimoto et al. |

FOREIGN PATENT DOCUMENTS

| | | |
|---|---|---|
| JP | 62-120795 | 6/1987 |
| JP | 63-203088 | 8/1988 |
| JP | 4-358492 | 12/1992 |
| JP | 5-232435 | 9/1993 |
| JP | 6-29914 | 4/1994 |
| JP | 6-324320 | 11/1994 |
| JP | 7-181429 | 7/1995 |
| JP | 9-127462 | 5/1997 |
| JP | 2908300 | 6/1999 |
| JP | 2004-4167 | 1/2004 |

* cited by examiner

TOP VIEW

FRONT VIEW

SIDE VIEW

INCIDENT BEAM

LINEAR POLARIZATION

1st ORIENTATION

2nd ORIENTATION

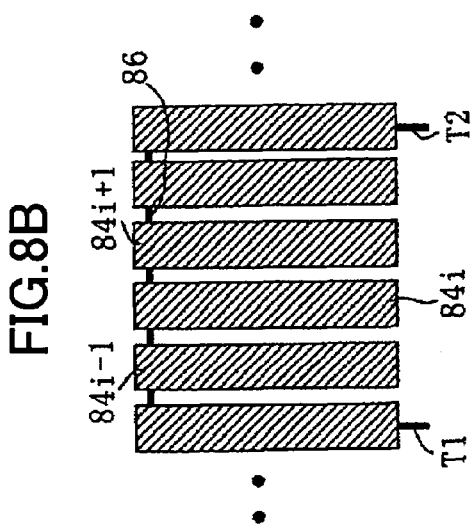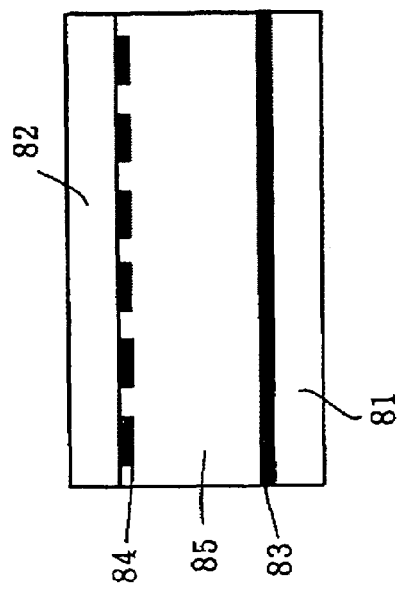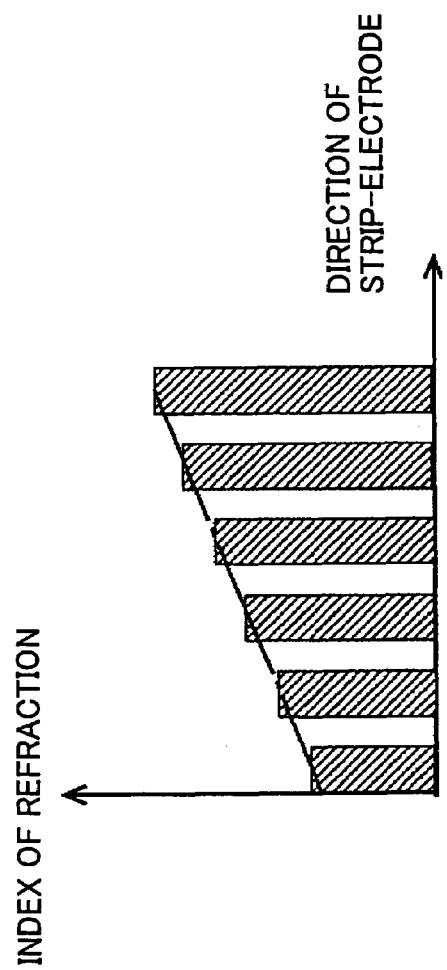

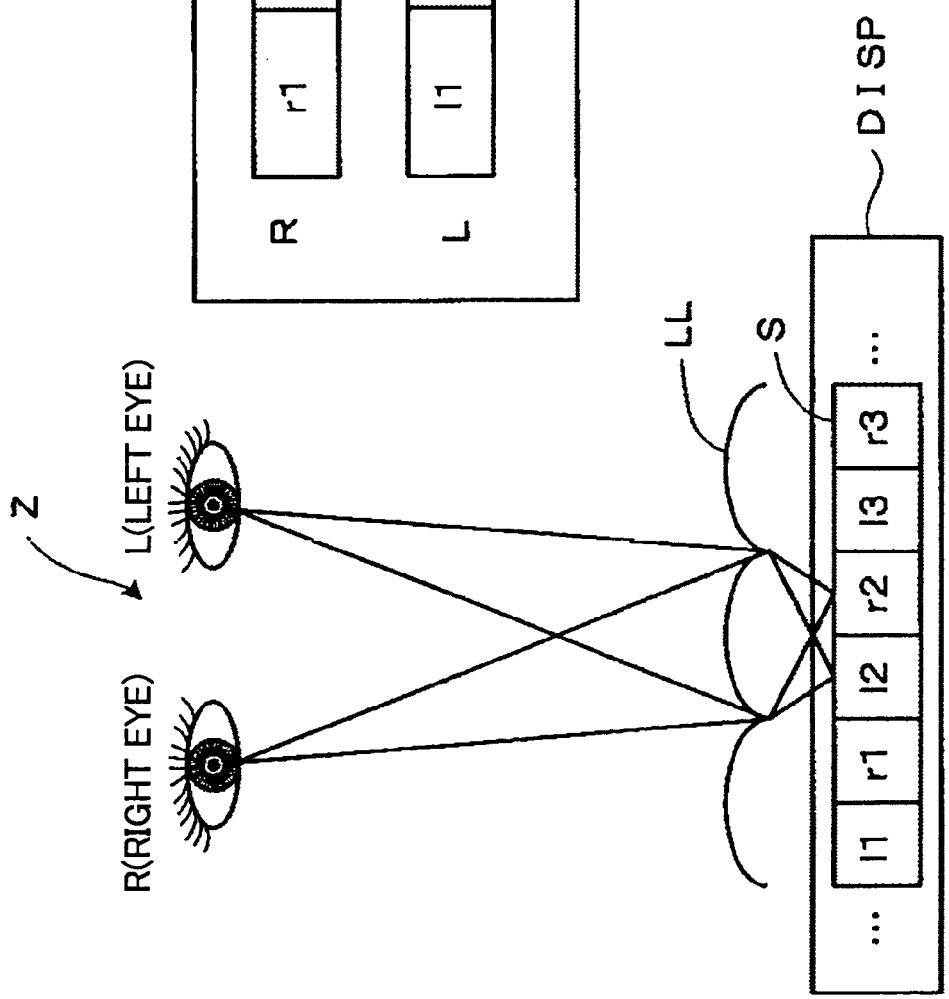

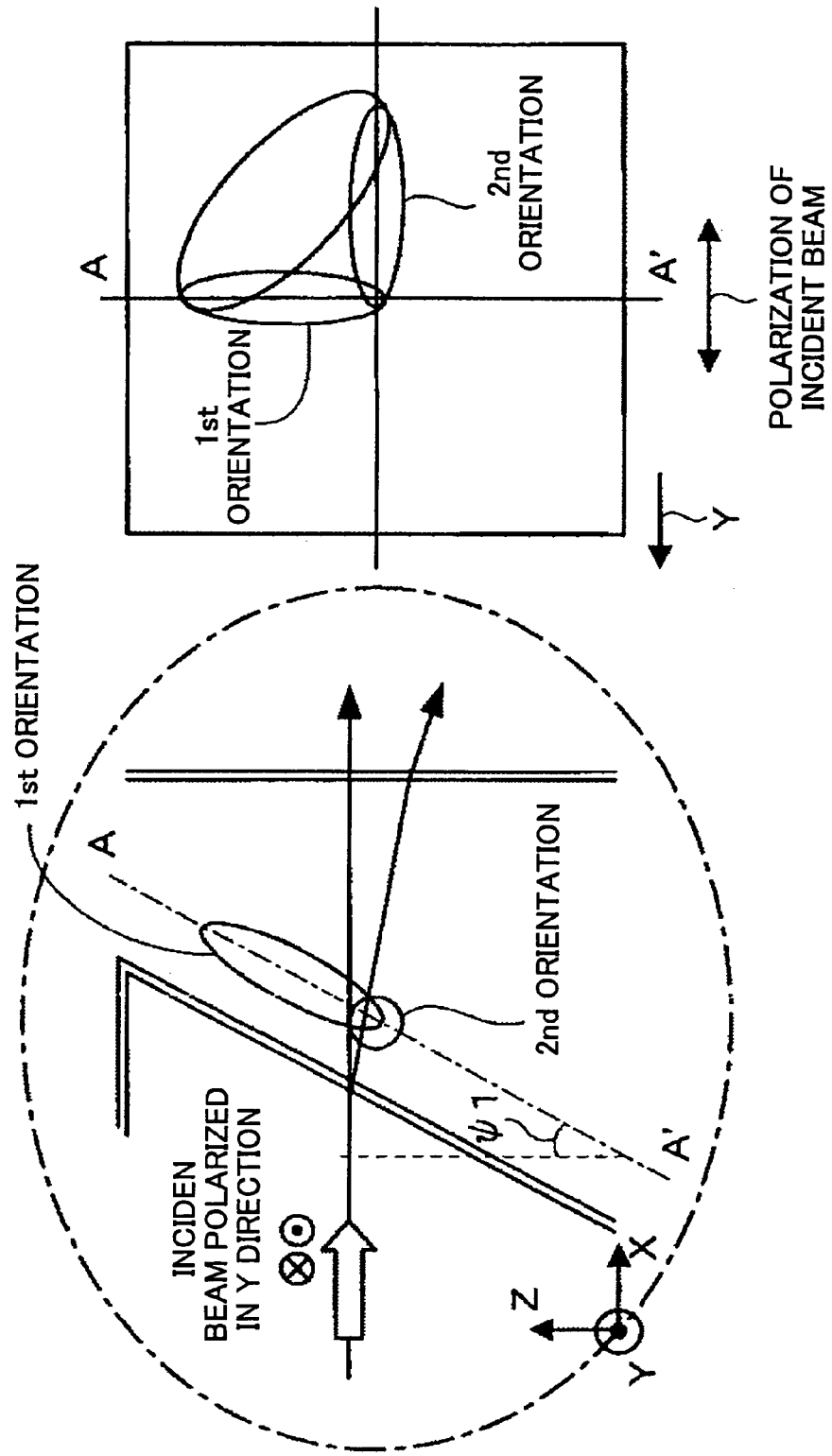

SNELL'S LAW

METHOD AND APPARATUS FOR DISPLAYING THREE-DIMENSIONAL STEREO IMAGE USING LIGHT DEFLECTOR

BACKGROUND OF THE INVENTION

1. Field of the Invention

The present invention generally relates to a method and apparatus for displaying a three-dimensional (3D) stereo image, and more particularly to a 3D stereo image display technique making use of a light deflector to allow an observer or a viewer to perceive a three-dimensional image without wearing special glasses.

2. Description of Related Art

Stereoscopic sense is derived from the mechanism of binocular parallax, where images reflected in the left eye and the right eye differ from each other. Various studies have been made on three-dimensional (3D) image display apparatuses. For example, JP 53-80114A discloses a stereo television apparatus that requires viewers to wear special glasses (using a left-eye lens and a right-eye lens with 90-degree shifted polarization).

Other types of 3D image display apparatuses that do not require special glasses have also been developed. For example, JP 7-181429A discloses a 3D image display apparatus that employs a light source for generating light stripes to project images separately to the left eye and the right eye of the observer in order to give binocular vision. In addition, JP 5-232435A and Japanese Patent No. 2,908,300 (issued from JP 09-159971A) disclose a technique of using a parallax barrier or a lenticular lens to reproduce stereo images making use of binocular parallax, in order to implement a projection type or direct-view type 3D image display apparatus.

With the conventional techniques, the image displayed on the screen is separated into two components, namely, a left-eye image and a right-eye image by means of a striped barrier (or a light source for generating a stripe of light) or a lenticular lens array. The left-eye image is reflected into the left eye of the observer, and the right-eye image is reflected into the right eye of the observer. Consequently, the observer perceives a three-dimensional image due to binocular parallax.

Since, in JP 7-181429A, the displayed image is separated into the left-eye image and the right-eye image using a light source with a striped shield, the horizontal resolution for the observer decreases.

The technique disclosed in. JP 5-232435A uses multiple liquid crystal panels (light bulbs) with an ordinary aperture ratio to optically superpose the images to improve the resolution. However, this technique causes the 3D image display apparatus to become large with increased cost.

JP 09-159971A employs a lenticular lens with a polarizing plate array, together with polarizing direction switching means that operates in synchronization with the left image and right image displayed in a time dividing manner, thereby spatially separating an image into a left image component and a right image component to produce three-dimensional vision. Although the resolutions of the left image and the right image are the same as those of an existing LCD panel, the pixel size becomes half due to the polarizing direction switching means and the polarizing plate array. To this end, the light use efficiency decreases.

With the conventional techniques, the horizontal resolution decreases inevitably because the alternately arranged left-eye image and the right-eye image on a display device are perceived separately. To increase the resolution with the conventional arrangement, the size of the 3D image display apparatus has to be increased.

Meanwhile, it is desired to widen a perceivable range for three-dimensional images, and a method for dividing a space on the image display means corresponding to multiple viewpoints (or observation positions) is proposed. However, as the number of spatially divided areas increases, the substantive resolution decreases. Actually, a technique of allowing several people to enjoy high-resolution 3D images has not been realized.

SUMMARY OF THE INVENTION

Therefore, the present invention provides a technique for displaying a three-dimensional stereo image at high resolution in the horizontal direction.

The present invention also provides a technique for displaying a three-dimensional stereo image observable at multiple viewpoints with a satisfactory image quality.

In one aspect of the invention, a method for displaying a three-dimensional stereo image includes the steps of:
(a) displaying a left-eye image defined by a plurality of left-eye strip pixels and a right-eye image defined by a plurality of right-eye strip pixels such that the left-eye pixels and the right-eye pixels are arranged alternately from the left to the right in a width direction;
(b) guiding the left-eye image and the right-eye image separately to the left eye and the right eye, respectively, of an observer;
(c) shifting the left-eye image and the right-eye image by one pixel in an oscillating manner; and
(d) deflecting the left-eye image and the right-eye image synchronized with the one-pixel shifting operation.

In another aspect of the invention, a three-dimensional image display apparatus comprises:
(a) an image display device configured to display a left-eye image defined by a plurality of left-eye strip pixels and a right-eye image defined by a plurality of right-eye strip pixels such that the left-eye pixels and the right-eye pixels are arranged alternately from the left to the right in a width direction;
(b) an image separator positioned in front of the image display device and configured to guide the left-eye image and the right-eye image to the left eye and the right eye, respectively, of an observer separately;
(c) an image shifter configured to shift the left-eye image and the right-eye image by one pixel in an oscillating manner; and
(d) a light deflector configured to deflect the left-eye image and the right-eye image having passed through the image separator synchronized with the one-pixel shifting operation of the image shifter.

The light deflector includes, for example, a deflecting device and a voltage source for applying a voltage to the deflecting device. The deflecting device may take various configurations.

For example, the deflecting device comprises a pair of transparent substrates facing each other; a chiral smectic C phase liquid crystal layer held between the transparent substrates; a vertical aligning film formed on an inner surface of at least one of the transparent substrates; and two or more electrodes configured to apply an electric field to the liquid crystal layer parallel to the transparent substrates.

In another configuration, the deflecting device comprises a pair of transparent substrates facing each other; a nematic liquid crystal layer held between the transparent substrates;

an aligning film formed on an inner surface of at least one of the transparent substrates; and a pair of electrodes formed on the transparent substrates, at least one of the electrodes being an interlaced comb electrode, and the voltage being applied across the electrodes such that the intensity of an electric field varies between adjacent comb teeth of the interlaced comb electrode.

In still another configuration, the deflecting device comprises a pair of transparent substrates facing each other, at least one of the substrates having an inner surface with a saw-tooth profile with a slope corresponding to a direction of optical deflection; a liquid crystal layer held between the transparent substrates, the liquid crystal being in nematic phase or chiral smectic C phase; an aligning film formed on the inner surfaces of the transparent substrates; and two or more electrodes configured to apply the voltage to the liquid crystal layer.

In yet another configuration, the deflecting device comprises a pair of transparent substrates facing each other; a nematic liquid crystal layer held between the transparent substrates; an aligning film formed on an inner surface of the transparent substrates; and two or more electrodes formed on the substrates to apply the voltage to the liquid crystal layer, the electrode formed on at least one of the substrates being comprised of a plurality of strip electrodes connected to each other via a high-resistance resistive element.

In still another aspect of the invention, a method for displaying a three-dimensional stereo image includes the steps of:

(a) generating a plurality of input images corresponding to multiple viewpoints;
(b) displaying the input images on an image display device in a time-dividing manner;
(c) separating a light image from the image display device into a left-eye image and a right-eye image using an image separator positioned on a viewpoint side of the image display device; and
(d) deflecting light paths of the left-eye image and the right-eye image emitted from the image separator toward said multiple viewpoints.

In yet another aspect of the invention, a three-dimensional image display apparatus with multiple viewpoints is provided. This apparatus comprises an image display device positioned at a prescribed distance from multiple viewpoints; an image separator positioned on a viewpoint side of the image display device; and a light deflector configured to deflect a light image having passed through the image separator so as to guide the light image to the multiple viewpoints, wherein the image display device receives a plurality of input images generated corresponding to the multiple viewpoints, and displays the input images in a spatially time-dividing manner by spatially dividing the input image by L and time-dividing the input image by m, wherein m and L are natural numbers greater than or equal to 2.

Preferably, the image display device has a display area divided into a plurality of sub regions, each sub region having a width d, and the image separator is designed such that at least one of a shape, an index of refraction, and a transmissivity changes periodically at a pitch Ds defined by a product of L and d (Ds=L*d).

Preferably, the light deflector includes a reference deflecting device and one or more deflecting devices added to the deflecting device, and an angle of deflection θj of the j-th deflecting device added to the reference deflecting device is expressed as $$\theta j = \theta 0 * (1/2)^j (j=1, 2, \ldots, k)$$

where θ0 is an angle of deflection of the reference deflecting device, and k is the number of added deflecting devices.

BRIEF DESCRIPTION OF THE DRAWINGS

Other objects, features, and advantages of the present invention will become more apparent from the following detailed description when read in conjunction with the accompanying drawings, in which:

FIG. 8A through FIG. 8C illustrate yet another example of the deflecting device used in the light deflector shown in FIG. 1;

FIG. 13A and FIG. 13B illustrate another example the image separator for guiding a left-eye image and a right-eye image separately to the left eye and the right eye of the observer, respectively;

FIG. 27A and FIG. 27B illustrate the orientations of liquid crystal with and without voltage application;

DETAILED DESCRIPTION OF THE PREFERRED EMBODIMENT

The preferred embodiments of the present invention are next described below with reference to the attached drawings. In this specification, the "left to right direction" is the left to right direction for the observer when the observer views a 3D image. Similarly, the "vertical direction" is the vertical direction of the display image when the observer views a 3D image. The "left-eye image" is an image to be perceived by the left eye of the observer to reproduce a 3D image, and the "right-eye image" is an image to be perceived by the right eye of the observer to reproduce the 3D image. The left-eye image and the right-eye images are slightly different from each other according to the binocular parallax.

In the left-eye image and the right-eye image are strip images with the width in the left to right direction. The "left-eye pixel" is a strip-like subsection of the left-eye image defined by dividing the left-eye image. The "right-eye pixel" is a strip-like subsection of the right-eye image defined by dividing the right-eye image.

In the examples explained in the preferred embodiments, the left-eye pixels and the right-eye pixels are arranged alternately in the left to right (horizontal) direction on the image display device (such as a LCD panel), such that the longitudinal axes of the pixels extend in the vertical direction.

FIG. 1A through 1E illustrate the basic structure of the three-dimensional (3D) image display apparatus according to the first embodiment of the invention. The 3D image display apparatus includes an image display device 10, a left and right image separator 12, and a light deflector 14.

Figure 1A:
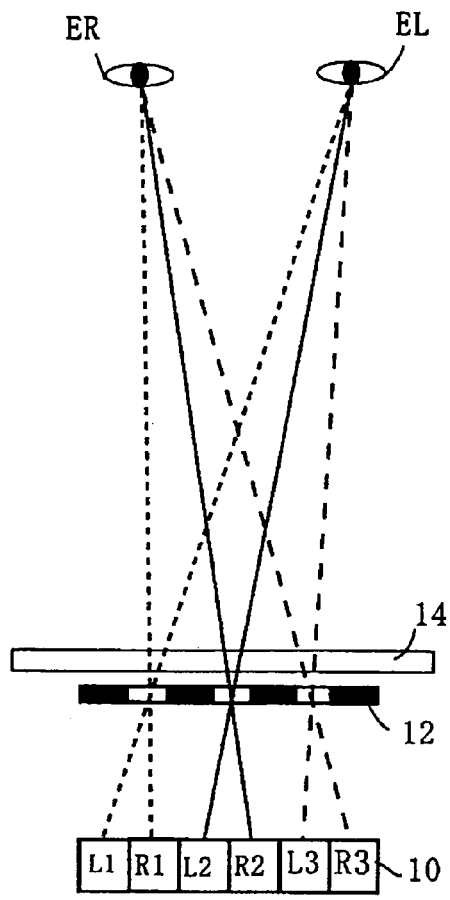
FIG. 1A through FIG. 1E are diagrams for explaining the basic structure of a 3D image display apparatus according to the first embodiment of the invention.

In FIG. 1A, a left-eye image defined by left-eye pixels L1, L2, and L3 on the image display device 10 is perceived by the left eye (EL) of the observer, through the apertures of the left and right image separator 12 and the light deflector 14. A right-eye image defined by right-eye pixels R1, R2, and R3 on the image display device 10 is perceived by the right eye (ER) of the observer, through the apertures of the left and right image separator 12 and the light deflector 14.

The image display device 10 is, for example, a direct view LCD panel, and a light beam is incident on the image display device 10 from a light source (not shown) positioned under the image display device 10 in FIG. 1A. The image display device 10 displays the left-eye image and the right-eye image defined by narrow strips of left-eye pixels and right-eye pixels, respectively, which extend perpendicular to the sheet of FIG. 1A.

Although FIG. 1A shows only a portion of the left-eye pixels L1, L2, and L3 and a portion of the right-eye pixels R1, R2, and R3, a number of left-eye pixels and right-eye pixels are arranged alternately in the horizontal direction of FIG. 1A.

For the observer, the left and right image separator 12 is positioned in front of the image display device 10, and the light deflector 14 is positioned in front of the left and right image separator 12. The left and right image separator 12 is formed of a stripe of narrow apertures (optically transparent portions) and narrow shields. Each of the apertures and the shields extends perpendicular to the sheet of FIG. 1A. The narrow apertures and the narrow shields are arranged alternately from the left to the right so as to shield the left-eye image with respect to the right eye (ER) of the observer, and to shield the right-eye image with respect to the left eye (EL) of the observer.

In the example shown in FIG. 1A, the light deflector 14 does not deflect the light image from the image display device 10. Accordingly, the light images having passed through the apertures (or the optically transparent portions) pass straight through the light deflector 14, and strike the observer's eyes.

To be more precise, the light beam from the right-eye pixel R1 reaches the right eye (ER) of the observer through the aperture of the left and right image separator 12, while the light beam from the left-eye pixel L1 does not reach the right eye (ER) of the observer because it is blocked by the optical shield of the left and right image separator 12. Similarly, the light beam from the left-eye pixel L1 reaches the left eye (EL) of the observer through the aperture of the left and right image separator 12, while the light beam from the right-eye pixel R1 does not reach the left eye (EL) of the observer because it is blocked by the optical shield of the left and right image separator 12.

In this manner, the left and right image separator 12 blocks the left-eye image with respect to the right eye (ER) of the observer, and blocks the right-eye image with respect to the left eye (EL) of the observer. Accordingly, the right eye (ER) of the observer perceives the right-eye image defined by pixels R1, R2, R3, . . . on the image display device 10, as illustrated in the upper line of FIG. 1C, and the left eye (EL) of the observer perceives the left-eye image defined by pixels L1, L2, L3, . . . on the image display device 10, as illustrated in the lower line of FIG. 1C.

The observer views a three-dimensional stereo image based on binocular parallax by perceiving the left-eye image and the right-eye image separately. With the 3D image display apparatus shown in FIG. 1A, the left-eye image and the right-eye image separately perceived by the observer are 50% thinned-out images, as illustrated in FIG. 1C. This means that the horizontal resolution of the three-dimensional image viewed by the observer is degraded.

Figure 1B:
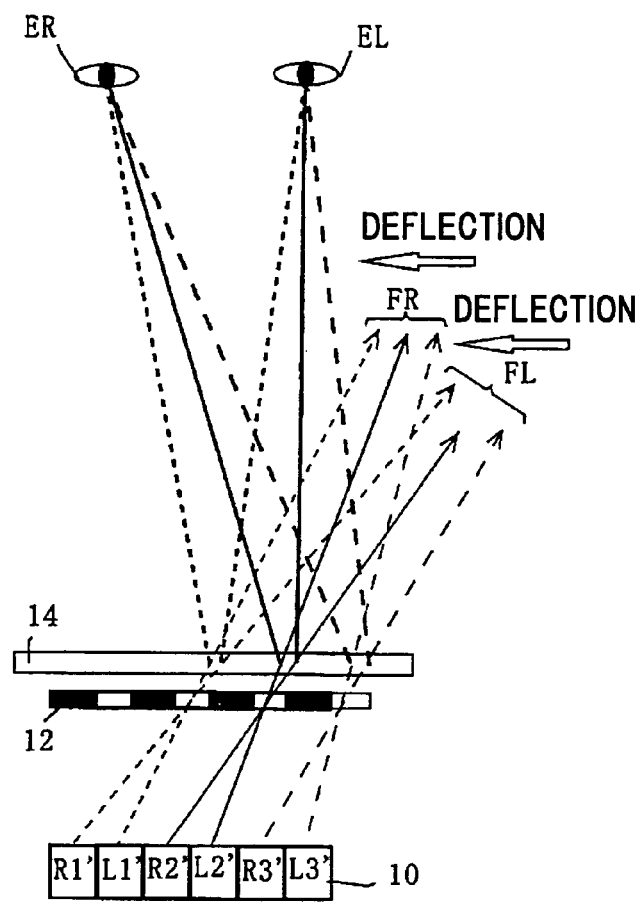
Figure 1C:
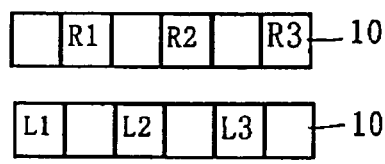
Figure 1D:
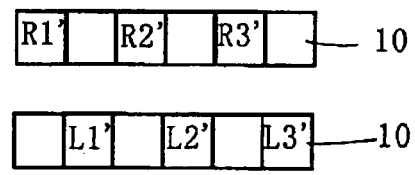

FIG. 1B illustrates the left-eye image and the right-eye image deflected by the light deflector 14. In FIG. 1B, the right-eye pixels R1', R2' and R3' are arranged on the image display device 10, which pixels shift to the left by one pixel, as compared with the arrangement shown in FIG. 1A. Similarly, the left-eye pixels L1', L2' and L3' displayed on the image display device 10 shift to the right by one pixel, as compared with the arrangement of FIG. 1A.

The right-eye pixel R1' is displayed on the position at which the left-pixel L1 is displayed in FIG. 1A, and the left-eye pixel L1' is displayed on the position at which the right-pixel R1 is displayed in FIG. 1A. Without deflection at the light deflector 14, the light beams from the left-eye pixels L1', L2'and L3' pass straight through the apertures of the left and right image separator 12, further pass straight through the deflector, and strike the right eye (ER) of the observer. The right eye of the observer perceives the left-eye image defined by the left-eye pixels. Similarly, the left eye EL of the observer perceives the right-eye image defined by the right-eye pixels R1', R2' and R3'. In this case, the observer cannot see a three-dimensional stereo image because the images perceived by the right and left eyes do not reflect the binocular parallax.

However, by deflecting the light fluxes FR and FL coming from the image display device 10 and having passed through the left and right image separator 12 at the light deflector 14, the observer can view the three-dimensional stereo image. In this case, the light flux FR from the right-eye pixels (shown in the upper line of FIG. 1D) is guided to the right eye (ER) of the observer and the light flux RL from the left-eye pixels (shown in the lower line of FIG. 1D) is guided to the left eye (EL) of the observer by the light deflector 14, generating binocular parallax.

The pixel arrangement on the image display device 10 shown in FIG. 1A and that shown in FIG. 1B are switched at a high rate. In synchronization with this switching operation of the image display device 10, optical deflection by the light deflector 14 is switched on and off to deflect the light image at an appropriate timing. By this synchronized switching operation, the observer perceives the left-eye image IL and the right-eye image IR shown in FIG. 1E at the left eye and the right eye, respectively.

Figure 1E:
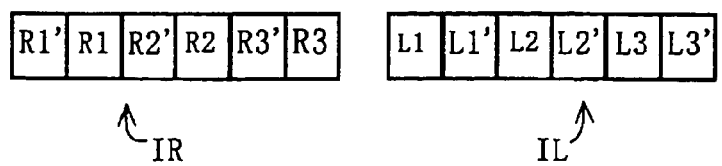

In FIG. 1E, the right-eye image IR is a composite image of the first image defined by the right-eye pixels R1, R2 and R3 and the second image defined by the right-eye pixels R1', R2' and R3', which mutually become residual images. Similarly, the left-eye image IL is a composite image of the first image defined by the left-eye pixels L1, L2 and L3 and the second image defined by the left-eye pixels L1', L2' and L3' based on the effect of the residual image. The left-eye image IL and the right-eye image IR make use of 100% of image display area of the image display device 10, and high resolution is achieved. The observer can view a high-resolution three-dimensional image.

In the technique shown in FIG. 1A through FIG. 1E, narrow strips of left-eye pixels and narrow strips of right-eye pixels are arranged alternately in the width direction of the pixels on the image display device, and the left-eye image defined by the left-eye pixels is guided to the left eye of the observer, while guiding the right-eye image defined by the right-eye pixels to the right-eye of the observer, using the left and right image separator 12 positioned in front of the image display device 10. This state is referred to as the first state shown in FIG. 1A. Then, the positions of the left-eye pixels and the right-eye pixels displayed on the image display device 10 are exchanged so as to shift by one pixel to the right or the left, and at the same time, the left-eye image and the right-eye image having passed through the left and right image separator 12 are deflected by the light deflector 14, in synchronization with the shift of the pixel positions. This state is referred to as the second state shown in FIG. 1B. The first state and the second state are switched repeatedly by shifting the pixel position by one pixel in an oscillating manner, which arrangement allows the observer to view a high-resolution three-dimensional image.

The 3D image display apparatus shown in FIG. 1A through FIG. 1B includes an image display device 10 having narrow strips of left-eye pixels and right-eye pixels arranged alternately in the width direction and configured to display a left-eye image defined by the left-eye pixels and a right-eye image defined by the right-eye pixels; a left and right image separator 12 positioned in front of the image display device 10 and configured to separate the left-eye image and the right-eye image so as to be perceived by the left eye and the right eye, respectively, of the observer independently; an image shifter (not shown) configured to shift the positions of the left-eye image and the right-eye image on the image display device 10 by one pixel in an oscillating manner; and a light deflector configured to deflect the left-eye image and the right-eye image having passed through the left and right image separator, in synchronization with the image shift by the image shifter.

Although the angle of deflection of the light deflector 14 is depicted large in FIG. 1B for sake of illustration, the actual angle of deflection of the light deflector 14 is minute because the observer's eyes are sufficiently distant from the light deflector 14. In addition, the light deflector 14 can not only deflect the direction of the light beam, but can also translate the light beam (for parallel displacement) by a minute scale.

Figure 2A:
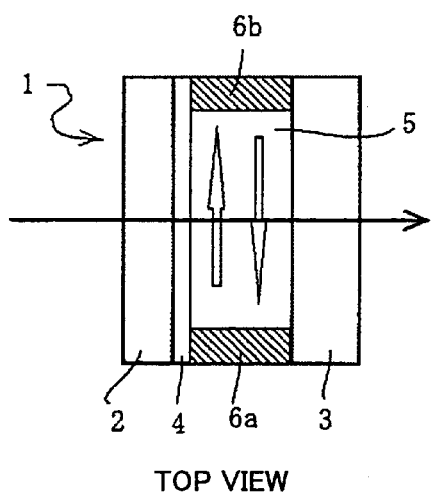
FIG. 2A through FIG. 2C illustrate an example of the deflecting device used in the light deflector shown in FIG. 1.
Figure 2B:
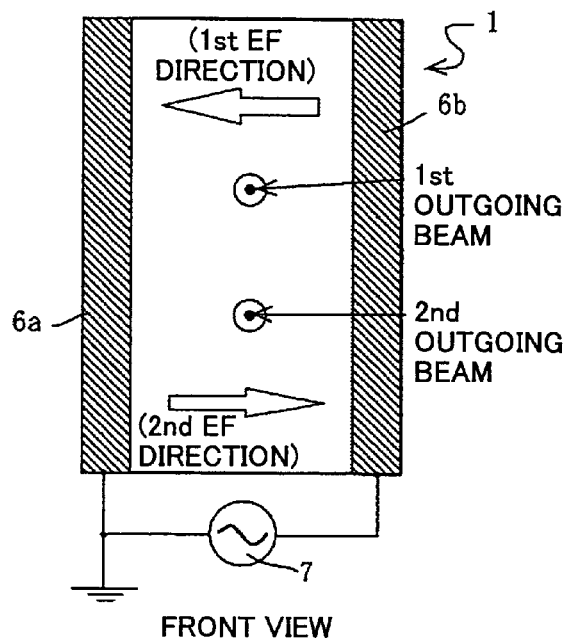
Figure 2C:
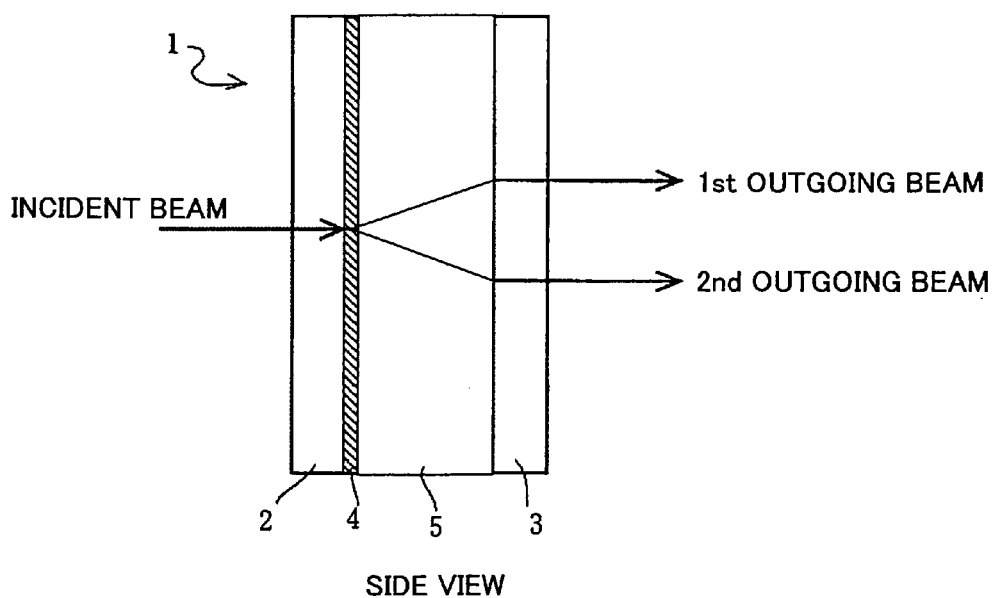

FIG. 2A through FIG. 2C illustrate an example of the deflecting device 1 used in the light deflector 14 shown in FIG. 1A and FIG. 1B. FIG. 2A is a top view, FIG. 2B is a front view, and FIG. 2C is a side view of the deflecting device 1.

The deflecting device 1 has a pair of transparent substrates 2 and 3, which are positioned parallel to each other so as to face each other, as shown in FIG. 2A. At lease one of the transparent substrates 2 and 3 (the substrate 2 in this example) has a vertical aligning film 4 on its inner surface. A liquid crystal layer 5 that is capable of forming a chiral smectic C phase is between the vertical aligning film 4 and the other substrate 3.

As illustrated in FIG. 2B, a pair of electrodes 6a and 6b are provided so as to face each other in the light deflecting direction. The electrodes 6a and 6b are connected to a power source 7, which applies a voltage across the electrodes 6a and 6b. Spacers for defining the space between the substrates 2 and 3 may be provided. However, in the arrangement shown in FIG. 2A, the electrodes 6a and 6b function as the spacers. The electrodes 6a and 6b are arranged such that the electric field (EF) vectors (indicated by the white arrows) orient in directions substantially perpendicular to the rotational axis of the liquid crystal of the liquid crystal layer 5 so as not to overlap the light path of the transmitted light beam.

The incident light is deflected forward the electric fields generated by the electrodes 6a and 6b, and exits the deflecting device 1 as either the first or second outgoing beam depending on the electric field.

The molecular structure of the liquid crystal material that forms the chiral smectic C phase includes a main chain, a spacer, a frame, a bond portion, and a chiral part. The main chain structure may include polyacrylate, polymethacrylate, polysiloxane, or polyoxyethylene. The spacer couples the frame that takes a role in molecule rotation, the bond portion, and the chiral part with the main chain. As the spacer, a methylene chain of an appropriate length may be selected. The chiral part is coupled with the rigid frame (such as biphenyl structure) via —COO—.

A so-called "homeotropic alignment" is obtained in the ferroelectric liquid crystal layer 5 by means of the vertical aligning film 4, where the rotational axis of helical rotation of the molecule is perpendicular to the surface of the substrates 2 and 3. To obtain homeotropic alignment, various conventional methods, such as an arterial shearing force method, a magnetic field aligning method, a temperature gradient method, SiO oblique deposition, and photo-alignment, may be used. See, for example, "Structure and Properties of Ferroelectric Liquid Crystal", Takezoe and Fukuda, at 235, CORONA Publishing Co. Ltd.

Figure 3A:
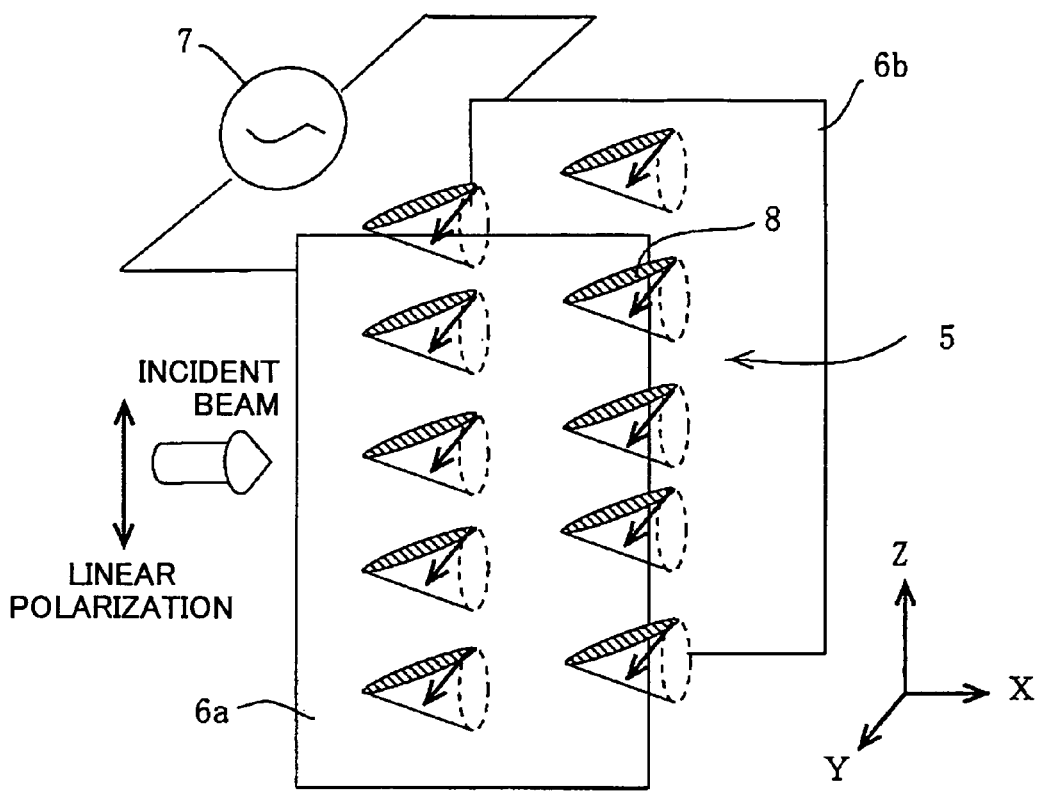
FIG. 3A through FIG. 3C are schematic diagrams for explaining optical deflection caused by the deflecting device shown in FIG. 2.
Figure 3B:
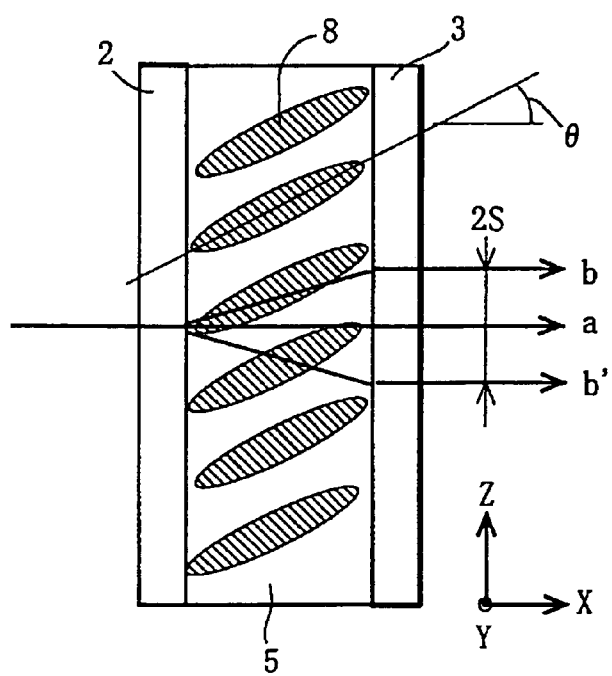
Figure 3C:
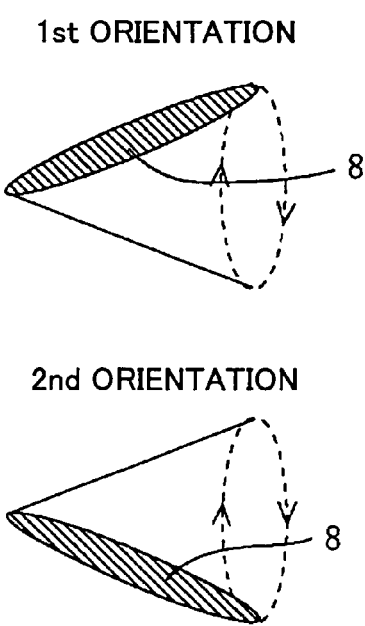

FIG. 3A through FIG. 3C illustrate optical deflection of the deflecting device 1 shown in FIG. 2. FIG. 3A schematically shows the alignment of the liquid crystal molecules of the deflecting device 1. The electric field generated by a voltage applied across the electrodes 6a and 6b is in the Y direction in the state of FIG. 3A. The direction of the electric field is switched by the power source 7 depending on the target deflecting direction (for either the first outgoing beam path or the second outgoing beam path).

The incident light on the deflecting device 1 is linearly polarized in the Z direction, and the electrodes 6a and 6b, which also function as the spacers, are arranged facing each other such that the direction of the electric field (Y direction) is perpendicular to the polarizing direction. Although not shown in FIG. 3A, it is desired to provide an electromagnetic shield to protect the peripheral devices around the deflecting device 1 from adverse affect of electric field leakage from the electrodes 6a and 6b.

In the X-Z cross-section of the liquid crystal layer 5, the director 8 of the liquid crystal aligns in either the first orientation or the second orientation, as shown in FIG. 3C. The director 8 of the liquid crystal makes a rotation along an imaginary cone at a tilt angle θ, as illustrated in FIG. 3B.

If, as illustrated in FIG. 3A, the spontaneous polarization Ps of the liquid crystal molecule is positive, and if the electric field E is in the positive Y direction, then the director 8 of the liquid crystal is within the X-Z plane because the rotational axis of the liquid crystal is substantially perpendicular to the substrates 2 and 3. The index of refraction along the long axis of the liquid crystal molecule is "ne", and the index of refraction along the minor axis is "no".

When the incident light linearly polarized in the Y direction advances in the positive X direction, it goes straight as an ordinary ray along the light path shown in FIG. 3B under the index of refraction "no", without being subjected to deflection.

When the incident light linearly polarized in the Z direction advances in the positive X direction, the index of refraction in the incident direction is obtained from the orientation of the liquid crystal director 8 and refractive indexes no and ne, based on the relation with the direction of the light beam passing through the center of a refractive index ellipsoid with no and ne on the major axis.

The incident light linearly polarized in the Z direction is subjected to deflection determined by the refractive indexes no and ne and the orientation of the liquid crystal director 8 (with average tilt angle of the optical axis at θ), and is deflected toward the light path b, as illustrated in FIG. 3B, when the liquid crystal director 8 is in the first orientation.

When the electric field is switched to the negative Y direction, then the liquid crystal director 8 is oriented to the line-symmetric position (in the second orientation) with respect to the X axis. Accordingly, the incident light linearly polarized in the Z direction is deflected along the light path b'. By regulating the direction of the electric field acting on the liquid crystal layer 5, the light path of the outgoing beam can be switched between b and b' to guide either the first or the second outgoing beam shown in FIG. 2. The shifting amount of the outgoing beam is denoted as 2S.

The above-described light deflector includes a deflecting device 1 and a voltage source 7 for applying a voltage to the deflecting device 1. The deflecting device 1 has a pair of transparent substrates 2 and 3 facing each other with a prescribed space between them, a liquid crystal layer 5 with chiral smectic C phase filling in the space between the substrates 2 and 3, a vertical aligning film 4 formed on the inner face of at least one of the substrates 2 and 3, and two or more electrodes 6a and 6b arranged to apply an electric field to the liquid crystal layer 5 such that the electric field is substantially parallel to the substrates 2 and 3. The voltage source 7 applies a voltage across the electrodes 6a and 6b.

When displaying a high-resolution stereo image making use of high-speed switching of deflection of the light deflector, flicker is likely to occur in the displayed three-dimensional images if the response of beam deflection is slow. However, by using the light deflector shown in FIG.2 and FIG. 3, a high-resolution stereo image can be displayed without flicker because of fast response of beam deflection.

Figure 4A:
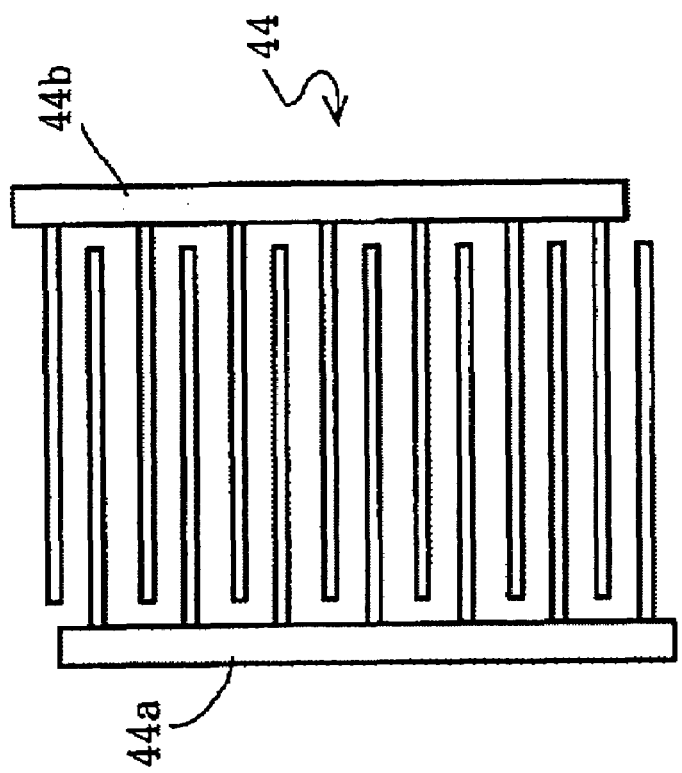
FIG. 4A and FIG. 4B illustrate another example of the deflecting device used in the light deflector shown in FIG. 1.
Figure 4B:
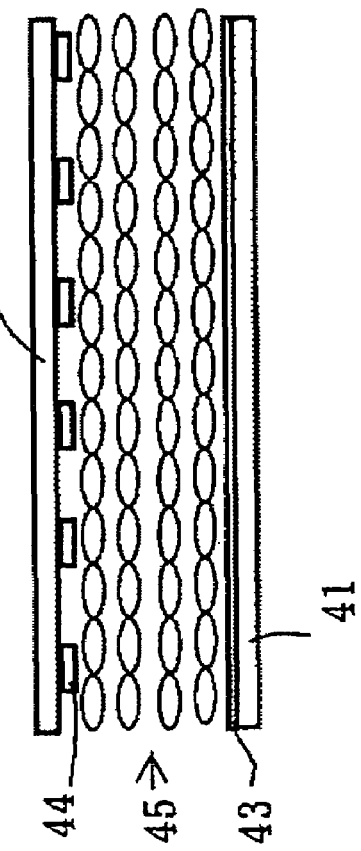

FIG. 4A and FIG. 4B illustrate another example of the deflecting device of the light deflector 14. The deflecting device shown in FIG. 4 includes a pair of transparent substrates 41 and 42 arranged parallel to each other with a prescribed gap between them using a spacer (not shown). Between the substrates 41 and 42 are provided a nematic phase liquid crystal layer 45 and transparent electrodes 43 and 44. The transparent electrode 43 is formed over the entire area on the inner face of the substrate 41. The transparent electrode 44 is comprised of a pair of interlaced comb electrodes 44a and 44b, as illustrated in FIG. 4B. The liquid crystal layer 5 is homogeneously aligned nematic liquid crystal with the axis of the LC director aligned with the deflecting direction of the incident light.

Figure 5A:
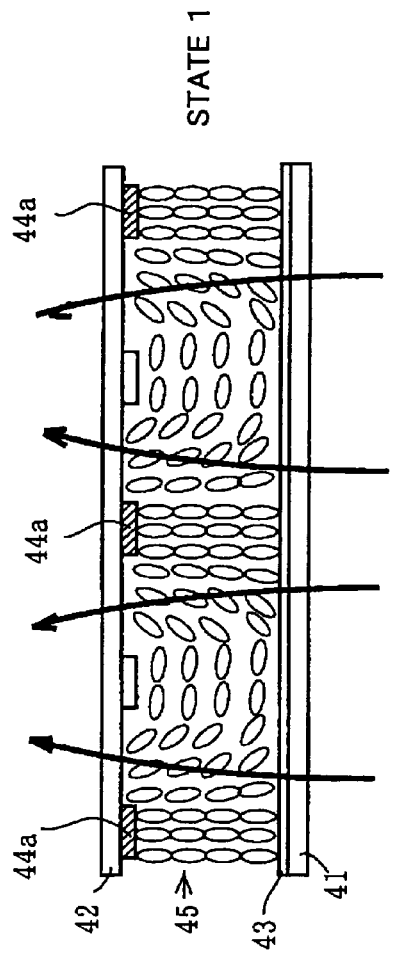
FIG. 5A through FIG. 5C are diagrams for explaining optical deflection caused by the deflecting device shown in FIG. 4.
Figure 5B:
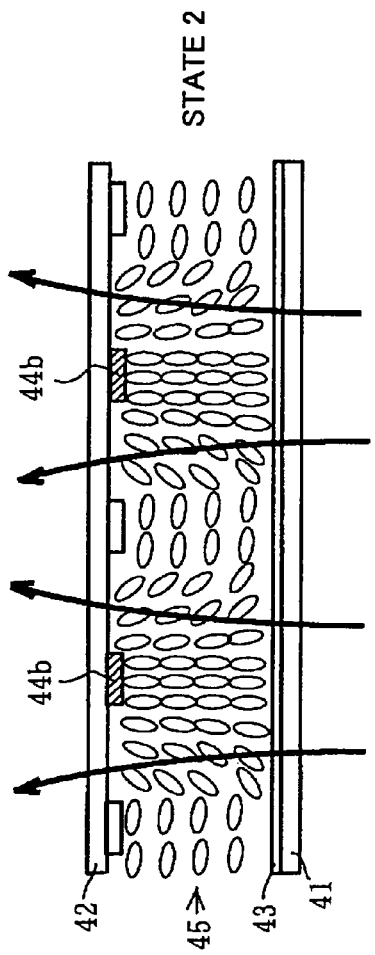
Figure 5C:
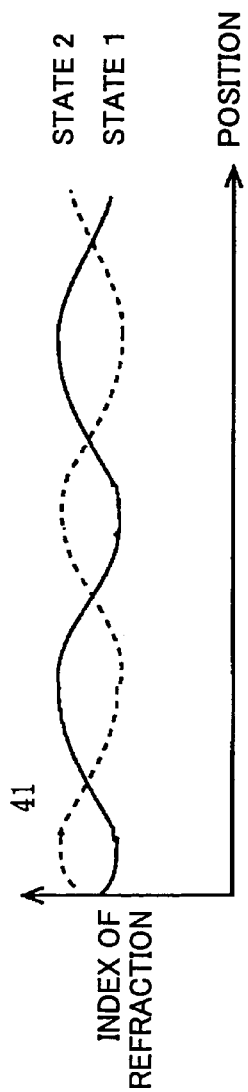

FIG. 5A through FIG. 5C illustrate optical deflection by the deflecting device shown in FIG. 4. In FIG. 5A, a voltage at or above the threshold level is applied across the electrode 43 and electrode 44a (one of the comb electrodes), which is referred to as the first state. The liquid crystal molecules between the voltage-applied electrodes align perpendicular to the substrates 41 and 42 due to the electric field, while the liquid crystal molecules between the turned-off electrodes align parallel to the substrates 41 and 42.

Because of the orientational distribution of the liquid crystal molecules due to a non-uniform electric field, distribution of index refraction with respect to an extraordinary ray occurs. When a linearly polarized beam having a plane of polarization parallel to the page of FIG. 5A is incident on the deflecting device, the effective index of refraction decreases as the long axis of the liquid crystal molecule approaches the vertical to the substrate. Consequently, distribution of the index of refraction indicated by the solid line in FIG. 5C is produced. Because of the refractive index distribution, the incident beam is deflected as indicated by the bold arrows in FIG. 5A and passes through the deflecting device.

On the other hand, when a voltage at or above the threshold level is applied across the electrode 43 and electrode 44b (the other of the comb electrodes), the alignment of the liquid crystal molecules changes to the second state as illustrated in FIG. 5B. The distribution of the index refraction in the second state is illustrated by the dashed line in FIG. 5C. Because of this distribution of index of refraction, the incident beam is deflected by the bold arrows shown in FIG. 5B, and passes through the deflecting device.

In this manner, by changing a voltage-applied electrode between the comb electrodes 44a and 44b, the deflecting direction of the light beam transmitted through the deflecting device can be switched. The light deflector using the deflecting element shown in FIG. 4 is advantageous because a voltage is simply applied across the electrode 43 and one of the comb electrodes 44a and 44b, and the light deflector is driven at a lower voltage than the deflecting device shown in FIG. 2.

The light deflector shown in FIG. 4 and FIG. 5 includes a deflecting device and a voltage source for applying a voltage to the deflecting device. The deflecting device has a pair of transparent substrates 41 and 42 facing each other with a prescribed space between them, a nematic liquid crystal layer 45 held between the substrates 41 and 42, an aligning film formed on the inner face of each of the substrates 41 and 42, and a pair of electrodes 43 and 44, each of which being provided to one of the substrates 41 and 42. One of the electrodes 43 and 44 (electrode 44 in the example shown in FIG. 4 and FIG. 5) is comprised of interlaced comb electrodes 44a and 44b. The voltage source (not shown) selectively applies a voltage across the electrode 43 and one of the electrodes 44a and 44b.

Figure 6:
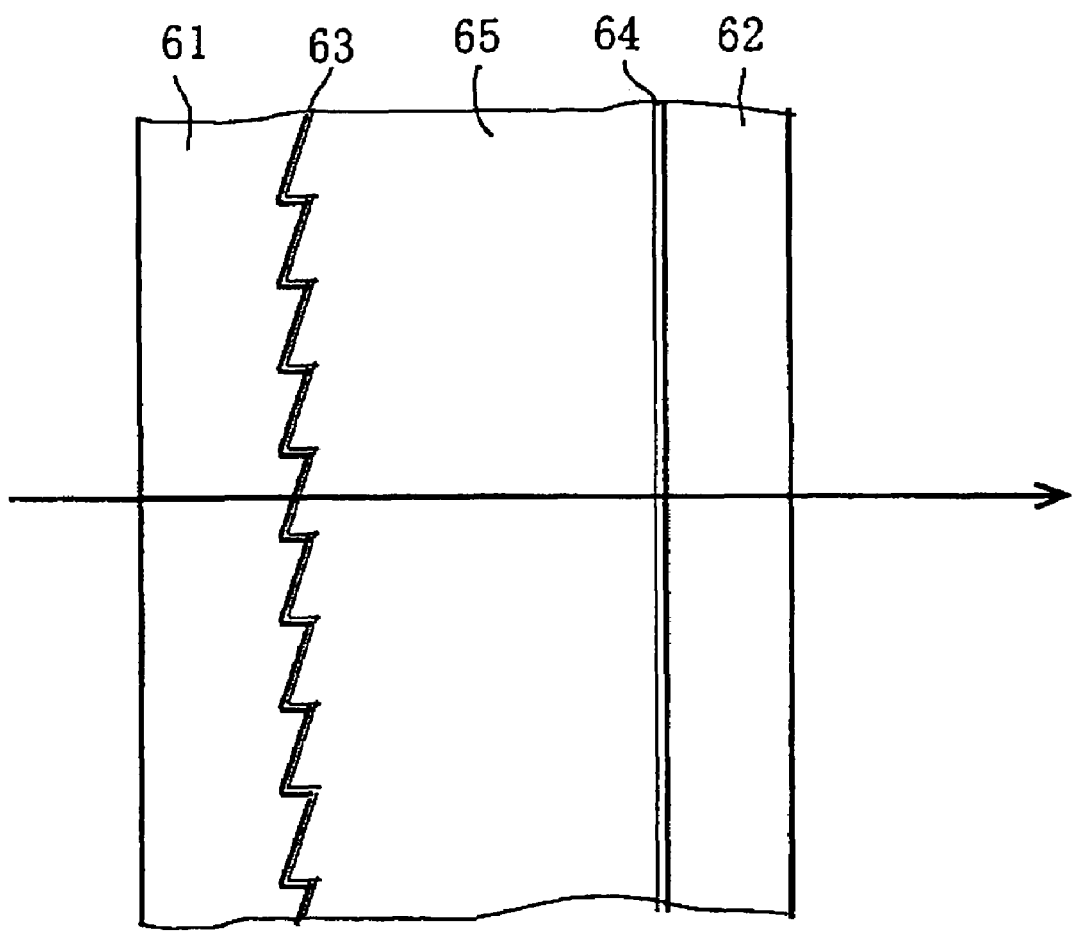
FIG. 6 illustrates still another example of the deflecting device used in the light deflector shown in FIG. 1.

FIG. 6 illustrates still anther example of the deflecting device used in the light deflector shown in FIG. 1. The deflecting device of FIG. 6 has a pair of transparent substrates 61 and 62, a liquid crystal layer 65 with a chiral smectic C phase or nematic phase held between the substrates 61 and 62, an aligning film (not shown) provided to the inner face of each of the substrates 61 and 62, and two or more electrodes 63 and 64 arranged to apply a voltage to the liquid crystal layer 65. The voltage is applied across the electrodes 63 and 64 by a voltage source (not shown). At least one of the substrates 61 and 62 (substrate 61 in this example) has an inner surface having a saw-tooth profile with a slope in the light deflecting direction (vertical direction in FIG. 6).

The saw-tooth profile is determined so as to provide the desired amount and desired direction of deflection to the incident light beam. The orientation of the chiral smectic C phase liquid crystal layer 65 (or the nematic phase liquid crystal layer 65) changes depending on the condition of voltage application. The voltage applying condition is selected such that the liquid crystal molecules align in one of the first and second orientations shown in FIG. 7B.

Figure 7B:
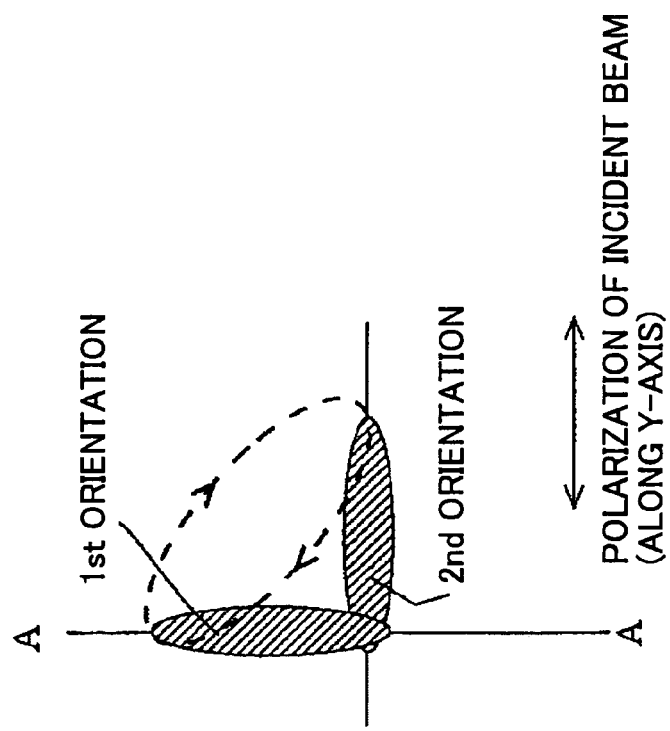
FIG. 7A and FIG. 7B are schematic diagrams for explaining optical deflection caused by the deflecting device shown in FIG. 6.
Figure 7A:
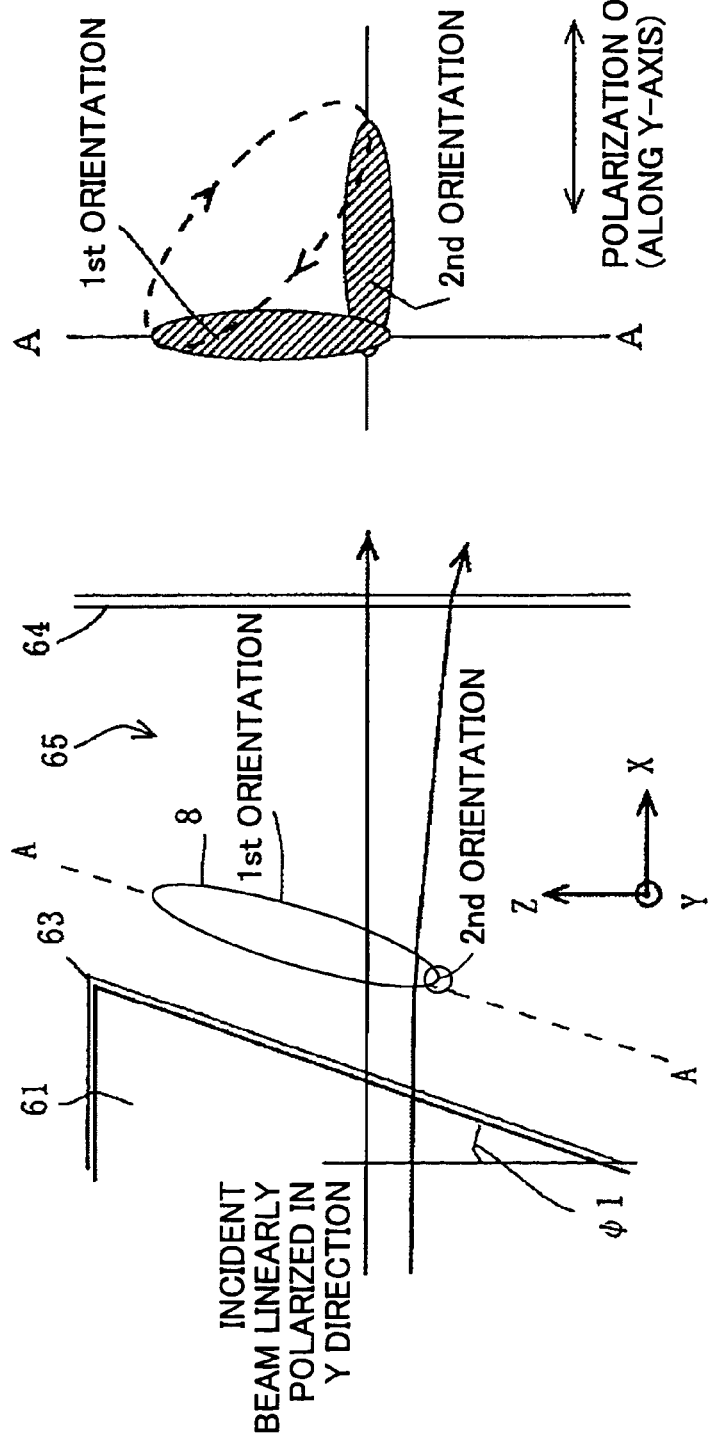

FIG. 7A is an enlarged view of the electrode 63 formed on the saw-tooth inner face of the substrate 61. Since the liquid crystal layer 65 can be any liquid crystal as long as the orientation of the liquid crystal molecules changes with the index of refraction also changed according to the voltage applying condition, either nematic liquid crystal or homogeneously aligned chiral smectic C liquid crystal may be used.

Each of the electrodes 63 and 64 is formed on one of the substrates 61 and 62 to apply an electric field in a direction perpendicular to the homogeneously aligned liquid crystal director (that is, in the direction of spontaneous polarization of the liquid crystal director).

The saw-tooth surface of the substrate 61, on which the electrode 63 is formed, has a slope at tilt angle φ1, which is defined by the incident beam and the normal to the slope.

FIG. 7B is a cross-sectional view taken along the A-A line shown in FIG. 7A. The liquid crystal director is oriented in one of the two directions (the first and second orientation) according to the direction of the electric field generated between the electrodes 63 and 64.

By regulating the orientation of the liquid crystal director in one of the two orthogonal directions, as illustrated in FIG. 7B, the incident beam can be deflected efficiently.

When the incident beam is linearly polarized in the Y direction, a voltage is applied across the electrodes 63 and 64 to generate an electric field that causes the liquid crystal director to align in the Z direction (in the first orientation). In this state, if the indexes of refraction of the liquid crystal layer 65 and the substrates 61 and 62 are the same, the incident beam behaves as an ordinary ray and passes through the deflecting device without deflection.

If the electric field is inverted to cause the liquid crystal director to align in the X direction (in the second orientation), the index of refraction of the liquid crystal layer 5 differs from that of the substrates 61 and 62. In this state, the incident beam behaves as an extraordinary ray and is deflected by the difference in index of refraction at the liquid crystal interface.

The aligning film (not shown) formed on the substrates 61 and 62 may be rubbed in the direction corresponding to the orientation of the liquid crystal in order to regulate the orientation of the liquid crystal molecules in two orthogonal directions. With the rubbing treatment, the orientation of the liquid crystal director is strictly regulated depending on the rubbing direction.

The aligning film is a conventional one, such as polyamide film used for TN liquid crystal or STN liquid crystal. It is preferable to perform rubbing or photo-alignment on the aligning film.

With the deflecting device shown in FIG. 6 and FIG. 7, the outgoing beam is rotated about the principal ray of the incident beam (which functions as the rotational axis) by regulating the orientation of the liquid crystal director. Accordingly, a desired amount of deflection can be set by appropriately selecting the distance between the deflecting device and the observer.

The above-described aligning method is applicable to the alignment of the liquid crystal molecules used in the deflecting device shown in FIG. 4 and FIG. 5.

To determine the beam direction in the deflecting device shown in FIG. 6 and FIG. 7, in a strict sense, indexes of refraction of the respective axes are determined from the orientation of the liquid crystal director with respect to the traveling direction of the incident beam and the indexes of refraction "no" and "ne" along the two axes, using the theory of an index ellipsoid. Then, based on the determined indexes of refraction, the deflecting direction is obtained. However, for simplifying the explanation, it is assumed that the indexes of refraction "no" and "ne" are switched alternately depending on the orientation of the liquid crystal, and the angle of deflection (representing the deflecting direction) is determined by applying Snell's law to the interface between the saw-tooth surface of the substrate 61 and the liquid crystal layer 65 and to the interface between the substrate 62 and the liquid crystal layer 65.

If the period of the saw-tooth substrate 61 does not correspond to the period of the image separation (that is, the pitch of the aperture of the left and right image separator 12 shown in FIG. 1), the light beam from the pixel on the image display device, which is to be perceived by the left or the right eye of the observer, may pass through the step of the saw-tooth surface. If the apex of the saw tooth is sharp, influence of the step of the saw tooth is negligible. However, it is difficult to make the apex of the saw tooth sharp, and in general, the apex has a certain radius of curvature.

For this reason, the step portion of the saw tooth may scatter the light, which may degrade the pixel image transmitted through the step portion. To avoid this problem, the period of the saw tooth is set so as to correspond to the image separation period of the left and right image separator.

Although not shown in FIG. 6, the saw-tooth surface may be formed on both glass substrates 61 and 62. In this case, the slopes of the saw-tooth surfaces of the two substrates are symmetrically arranged with respect to the liquid crystal layer 65.

FIG. 8A through FIG. 8C illustrate still another example of the deflecting device used in the light deflector. In this example, the deflecting device has a pair of transparent substrates 81 and 82 facing each other with a prescribed space between them using a spacer (not shown), as illustrated in FIG. 8A. The deflecting device also includes a nematic liquid crystal layer 85 arranged between the substrates 81 and 82, an aligning film (not shown) formed on the inner face of each of the substrates 81 and 82, and two or more electrodes 83 and 84 arranged so as to apply a voltage to the liquid crystal layer 85. At least one of the electrodes (the electrode 84 in this example) is comprised of a plurality of strips, as illustrated in FIG. 8B, so as to produce a sloped distribution of the index of refraction in the liquid crystal layer 85 under the application of a voltage. Two adjacent strips ($84i$ and $84i+1$) of the electrode 84 are connected via a resistive element, such as a high-resistance wire 84.

The electrode 83 is formed on the entire area of the inner face (on the liquid crystal side) of the substrate 81. The liquid crystal layer 85 is a nematic liquid crystal homogeneously aligned with the liquid crystal director axis in agreement with the deflecting direction of the incident light. The orientation of the liquid crystal molecule can be regulated between the first and second orientations, as in the previous example illustrated in FIG. 6 and FIG. 7.

When different voltages are applied to the terminals T1 and T2, the electric potential of the strips varies linearly from the strip connected to the terminal T1 toward one connected to the terminal T2, due to voltage drop at the high-resistance wire 86. If the electrode 83 is grounded, the intensity of the electric field applied to the liquid crystal layer 85 also changes linearly according to the slope of the electric potential. Consequently, the index of refraction of the liquid crystal layer 85 changes as a function of the electric potential of the strips, as illustrated in FIG. 8C. The portion of the liquid crystal that has the varying index of refraction is approximately equivalent to a prism in an optical sense, and therefore, it can deflect the light beam.

By realizing the deflecting function using a sloped distribution of the index of refraction, a deflecting device is fabricated with a simple structure, as compared to the deflecting device shown in FIG. 6 which requires a sawtooth surface to be formed in the substrate.

In this example, the light deflector includes the deflecting device shown in FIG. 8 and a voltage source (not shown) to apply a voltage across the electrodes 83 and 84 of the deflecting device. As explained above, the electrode 84 formed on at least one of the substrates 81 and 82 is comprised of a plurality of strips connected by a high-resistance resistive element 86, so as to produce a sloped distribution of the index of refraction in the nematic liquid crystal layer 85 upon application of the voltage.

The deflecting devices shown in FIGS. 2, 4, 6, and 8 are used together with the left and right image separator 12 shown in FIG. 1, which has a stripe of optical apertures (or transparent portions) and optical shields alternately arranged in the width direction from left to right in order to block the left-eye image with respect to the right eye and to block the right-eye image with respect to the left eye of the observer. A lenticular lens array having a plurality of lenticular lenses arranged from left to right may be used in place of the left and right image separator shown in FIG. 1.

Figure 9:
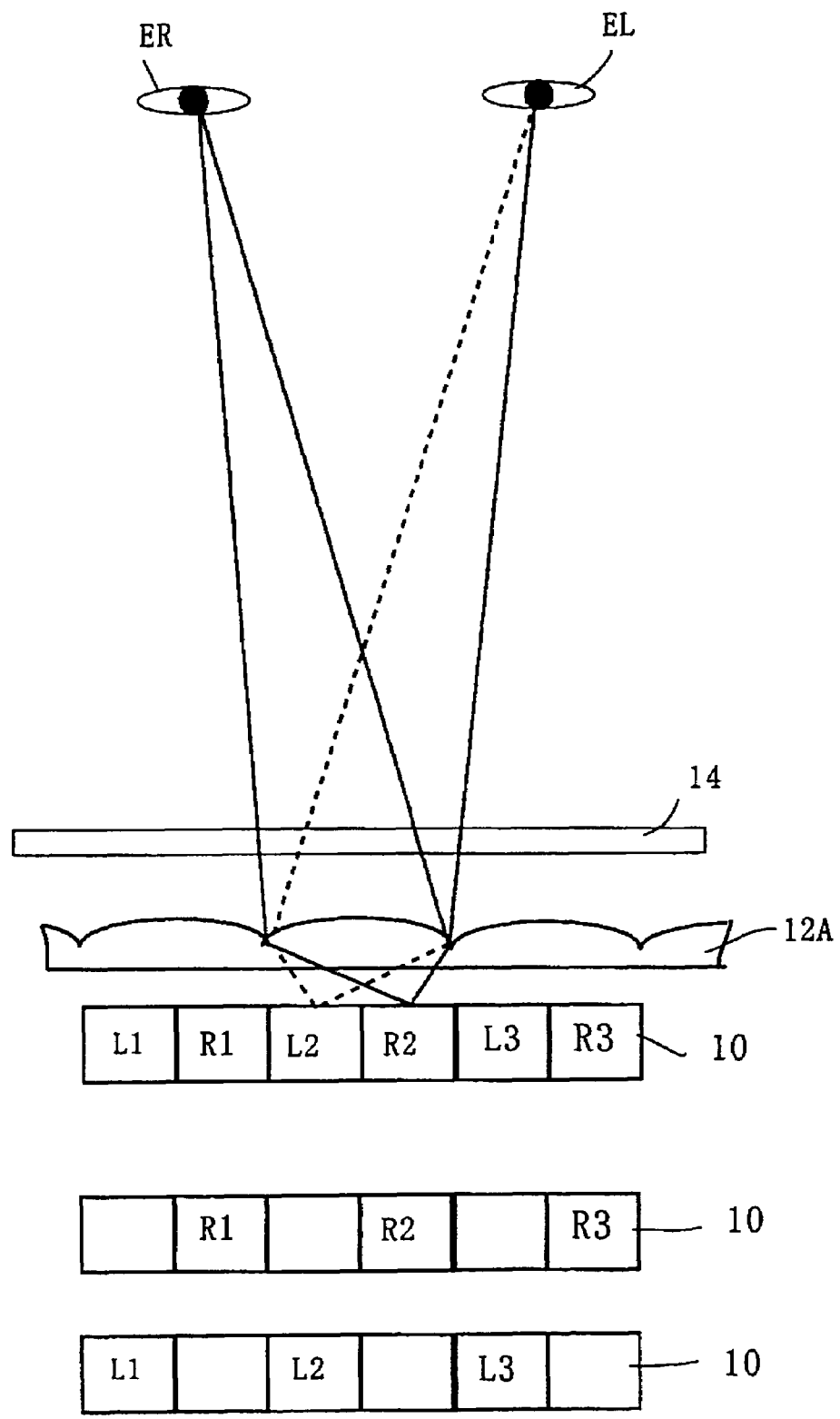
FIG. 9 illustrates a modification of the 3D image display apparatus according to the first embodiment of the invention.

FIG. 9 illustrates a 3D image display apparatus using a lenticular lens array 12A as the left and right image separator.

A lenticular lens is a minute lens having a convex cylindrical lens surface. The lenticular lens array (or the left and right image separator) 12A shown in FIG. 9 is arranged such that the generatrix (along the direction of no power) extends perpendicular to FIG. 9, and that the width of the cylindrical lens surface is equal to the period of the image separation (defined by a left-eye pixel and a right eye-pixel adjacent to each other).

The light beams from the adjacent two pixels covered by the same cylindrical lens surface are separated toward the left eye (EL) and the right eye (ER) because the principal rays of the beams tilt in opposite directions with respect to the optical axis of the lenticular lens.

With the striped barrier shown in FIG. 1 having alternately arranged apertures and shields, the light use efficiency may decrease due to the optical shields positioned between the image display device 10 and the observer. In contrast, the left and right image separator using the lenticular lens array shown in FIG. 9 can maintain the light use efficiency high and display a high-resolution three-dimensional image.

The pitch of the lenticular lens array is set so that the left-eye pixel image and the right-eye pixel image are perceived by the left eye and the right eye of the observer, respectively. By covering two or more columns of pixels (for multi-eye vision) on the image display device, the apparatus allows the observer to view the three-dimensional stereo image in a wide range.

Figure 10:
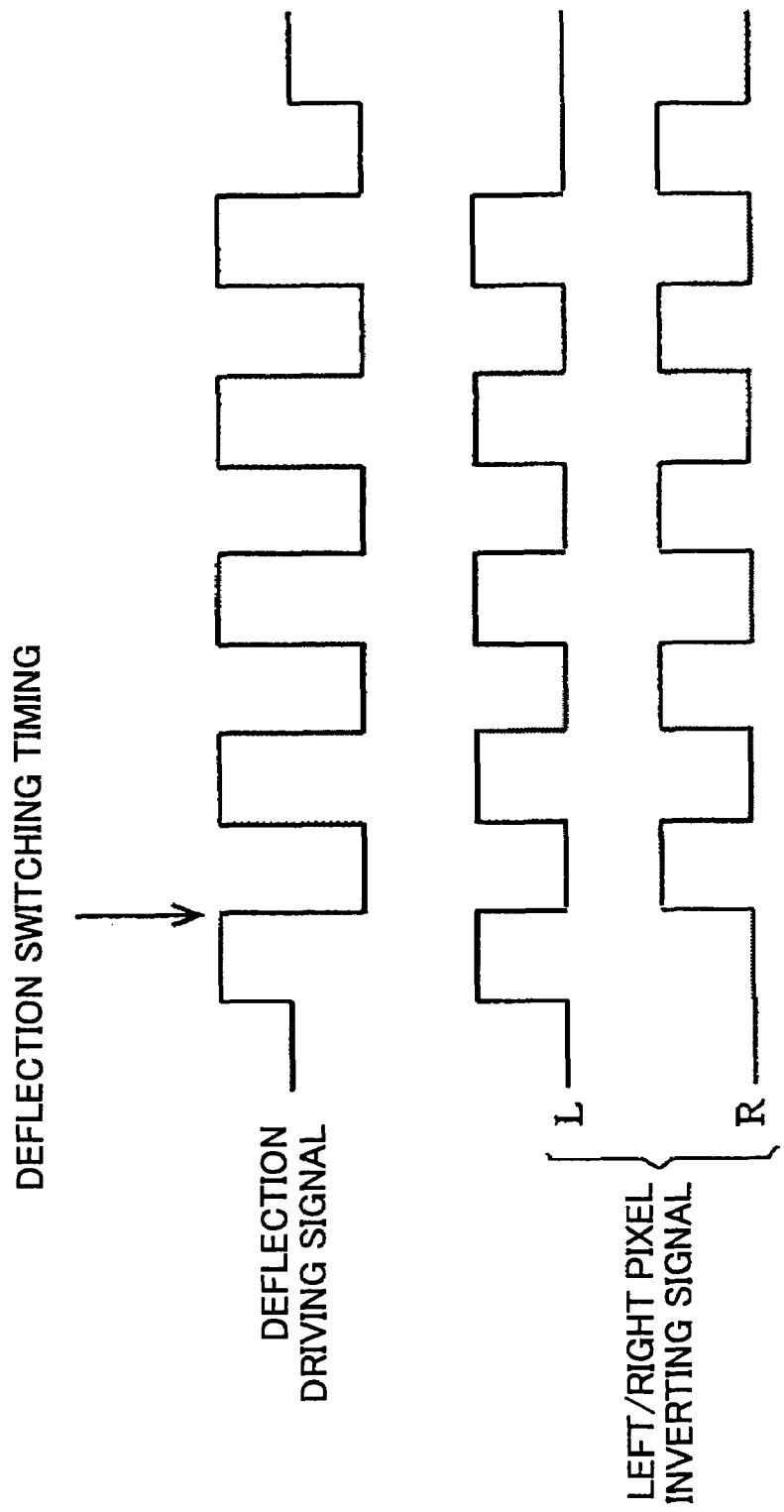
FIG. 10 is a timing chart showing the relation between the deflection driving signal and the left and right pixel inverting signal for switching on a left-eye pixel L and a right-eye pixel R.

FIG. 10 is a timing chart showing the timing of the deflection driving signal and the left and right pixel inverting signal consisting of a 180-degree phase-shifted signal pair.

The left-eye image and the right-eye image on the image display device are defined by left-eye pixels and right-eye pixels that are arranged alternately from left to right. The left-eye pixels are shifted by one pixel in an oscillating manner by an image shifter (not shown), synchronized with the switching of deflection. Similarly, the right-eye pixels are shifted by one pixel in an oscillating manner by an image shifter (not shown). Thus, the positions of the left-eye pixels and the right-eye pixels are switched.

In the image display device, a left-eye pixel and a right-eye pixel are displayed alternately by switching the displayed image. In synchronization with the switching timing of the deflection driving signal, the left and right pixel inverting signal is applied to a left-eye pixel L and a right-eye pixel R to be displayed in order to shift the left-eye image the right-eye image by one pixel in an oscillating manner.

Conventionally, a frame of pixel data of the image is displayed without deflection. In contrast, with the apparatus of the present invention, a frame of pixel data is displayed under the switching operation synchronized with optical deflection. In the first state shown in FIG. 1A, a half frame of pixel data for the left-eye image and a half frame of pixel data for the right-eye images are displayed. Then, in the second state shown in FIG. 1B, another half frame of pixel data for each of the left and right images (shifted by one pixel) is displayed. Thus, a full frame of pixel data is displayed for each of the left and right images by a switching or shifting cycle, and consequently, a high-resolution three-dimensional image can be displayed.

If the frame frequency of an entire frame for displaying a three-dimensional image is 60 Hz, the frame frequency required in image shifting for each of the left and right images is 30 Hz.

The image display device used in the 3D image display apparatus may be of a projection type or a direct-view type. In a conventional projection-type image display technique (such as an LCD projection panel), the polarizing direction of the outgoing beam may differ among the color components R, G and B. When applying the foregoing light deflector for deflecting a light beam making use of polarization of the light beam to a projector type color image display panel, the angle of deflection of the beam may differ depending on the direction of the polarization, with the light flux incident on the deflecting device whose polarization varies. Such variation in angle of deflection may cause color fluctuation in the displayed image.

To avoid this, the polarizing direction of the outgoing beams for the color components R, G and B need to be set equal in a projection-type image display technique. The polarization of the outgoing beams can be easily aligned in one direction by employing a field-sequential method for displaying the color components R, G, and B in a time dividing manner.

It is advantageous to use a direct-view LCD panel as the image display device because in a direct-view image display technique the polarizing direction of the outgoing beam from the LCD panel is always in the same direction.

Actual Examples are described below.

<Basic Structure>

A 3D image display apparatus is manufactured based on the structure shown in FIG. 1.

A typical liquid crystal display panel is used as the image display device 10, on which a left-eye image and a right-eye image are displayed upon input of the pixel signals. The pixel pitch (i.e., the distance between two adjacent left-eye and right-eye pixels) is about 0.1 mm.

The left and right image separator 12 is a slit barrier having a stripe of apertures (transparent portions) and shields arranged from left to right with the longitudinal axis perpendicular to the sheet of FIG. 1. The width of the aperture is about 0.2 mm.

The distance from the liquid crystal display panel (image display device 10 to the slit barrier (left and right image separator) 12 is set to 1.6 mm. A three-dimensional image is viewed from a position 1.0 m distant from the 3D image display apparatus.

EXAMPLE 1

A light deflector 14 is added to the above-described basic structure. A vertical aligning film is formed on a glass substrate by treating the surface of the glass substrate using a bind cilane (AY43-021 manufactured and sold by Dow Corning Toray Silicone Co., Ltd.). A pair of surface-treated glass substrates are held together with the vertical aligning films inside, using a pair of aluminum electrodes sheets of 40 μm as a spacer. The aluminum electrodes are set parallel to each other. It was assumed that the two aluminum electrode sheets were parallel to each other.

Each of the glass substrates is heated and held at about 90° C., and a ferroelectric liquid crystal (CS-1029 manufactured by Chisso Corporation) is injected between the two glass substrates by the capillary phenomena. After the glass substrates and the liquid crystal are cooled, the glass substrates are sealed with an adhesive, and a deflecting device shown in FIG. 2 is accomplished.

A line and space mask pattern with a width of 24.5 μm is arranged on the incident face of the deflecting device. A linearly polarized collimated beam is incident on the deflecting device on the mask pattern side. The direction of the linear polarization is parallel to the longitudinal axis of the aluminum electrode sheet (i.e., the vertical direction in FIG. 2B). The light beam having passed through the mask pattern is observed by a microscope between the aluminum electrode sheets, while maintaining the temperature of the deflecting device at 25° C.

When a rectangular pulse of about ±200 V is applied across the electrodes using a pulse generator and a high-speed power amplifier, it is observed that the mask pattern shifts parallel. Since the deflecting device, the mask pattern, and the microscope are mechanically stationary, it is ensured that optical deflection occurs electrically.

Then, the light deflector 14 using this deflecting device is added to the basic structure, and the deflecting device is driven, synchronized with the one-pixel shifting operation of the left-eye image and the right-eye image in an oscillating manner to the left and the right on the liquid crystal panel. A high-resolution three-dimensional image, which is clearer than that observed with the basic structure, was observed.

EXAMPLE 2

A deflecting device 14 of another arrangement is added to the basic structure.

Two transparent glass substrates are prepared, and an ITO electrode shaped in an interlaced comb, as shown in FIG. 4B, is formed on one of the glass substrates. The comb electrode pattern has a width of 50 μm, and a pitch of 100 μm. Another ITO electrode is formed on the entire surface of the other glass substrate. An aligning film with a thickness of about 800 Å is formed over each of the glass substrate on the side of the ITO electrode by applying a polyamide group material (AL3046-R31 manufactured by JSR Corporation) by spin coating.

After the glass substrates are annealed, rubbing is carried out on the ITO strip-electrode in the perpendicular direction to the strips. Then, the two glass substrate are held such that the ITO electrodes face each other, with PET Mylar (registered trademark) with a thickness of 10 μm inserted as a spacer between the glass substrates. The glass substrates are pressurized, and sealed with a UV-curing adhesive to form an empty cell. A nematic liquid crystal (ZL1-2471 supplied by Merck-Japan) with a positive anisotropic permittivity is injected in the empty cell by capillary phenomena to accomplish a deflecting device shown in FIG. 4. Since the rubbing directions on the two glass substrates are the same, the liquid crystal molecules are homogeneously aligned parallel to the glass substrates.

A voltage of ±15 V is applied to the deflecting device by a function generator. The input signal is a square wave signal, and the voltage value is measured by a tester. A white laser beam with a flux diameter of 1 mm is emitted toward the deflecting device. The wavelength of the incident beam is adjusted using a wavelength-selective filter (588 nm). A polarizing plate is inserted between the deflecting device and the laser to guide the linearly polarized beam onto the deflecting device having the interlaced comb electrode. The direction of linear polarization is set to the ruling direction of the comb electrode.

The transmitted light is observed by a CCD camera placed at 1 meter from the deflecting device, and it is confirmed that the transmitted light is deflected by application of a voltage.

Then, the light deflector 14 using the deflecting device of Example 2 is added to the basic structure, and the deflecting device is driven, synchronized with the one-pixel shifting operation of the left-eye image and the right-eye image in an oscillating manner to the left and the right on the liquid crystal panel. A high-resolution three-dimensional image, which is clearer than that observed with the basic structure, was observed.

EXAMPLE 3

A deflecting device 14 of still another arrangement is added to the basic structure.

A silica grass substrate is dry-etched to form a saw-tooth surface with a tilt angle of 0.5 degrees and a pitch of 500 μm. Then, an ITO is sputtered on the saw-tooth surface up to a thickness of 2000 Å to form an ITO electrode. Then, the silica glass substrate with the ITO electrode is coated with polyamide aligning material AL3046 up to the thickness of 800 Å. The AL3046 layer is rubbed such that the homogeneously stabilized direction becomes perpendicular to the slope of the saw-tooth surface. Another glass substrate with an ITO electrode having a flat surface is bonded to the silica glass substrate with the saw-tooth surface using a bead-mixed adhesive, such that the smaller thickness of the liquid crystal layer becomes 1.5 μm. A ferroelectric liquid crystal (R5002 manufactured by Clariant) is injected by capillary phenomena such that the injecting direction is along the saw-tooth shape. Then, the substrates are cooled from 77° C. to 55° C. under application of a DC voltage of 20 V/μm. Then, the glass substrates are sealed to accomplish the deflecting device illustrated in FIG. 6.

A voltage of ±10 V is applied to the deflecting device by a function generator. The input signal is a square wave signal, and the voltage value is measured by a tester. A white laser beam with a flux diameter of 1 mm is emitted toward the deflecting device. The wavelength of the incident beam is adjusted using a wavelength-selective filter (588 nm). A polarizing plate is inserted between the deflecting device and the laser to guide the linearly polarized beam onto the deflecting device having the saw-tooth electrode. The direction of linear polarization is set to the ruling direction of the saw-tooth electrode.

The transmitted light is observed by a CCD camera placed at 1 meter from the deflecting device, and deflection of the transmitted light is observed under application of a voltage.

Then, the light deflector 14 using the deflecting device of Example 3 is added to the basic structure, and the deflecting device is driven synchronized with the one-pixel shifting operation of the left-eye image and the right-eye image in an oscillating manner to the left and the right on the liquid crystal panel. A high-resolution three-dimensional image, which is clearer than that observed with the basic structure, was observed. In addition, the deflecting device is driven at a lower voltage, as compared with the Examples 1 and 2.

EXAMPLE 4

A deflecting device similar to that of Example 2 is fabricated, but with the pitch of the interlaced comb electrode set to 100 μm. This deflecting device is assembled in the basic structure, such that the pitch of the interlaced comb electrode corresponds to the pitch of the optical aperture (transparent portion) of the left and right image separator. The deflecting device is driven, synchronized with the one-pixel shifting operation of the left-eye image and the right-eye image in an oscillating manner to the left and the right on the liquid crystal panel. A high-resolution three-dimensional image, which is clearer than that observed with the basic structure, was observed. In addition, the contrast of the observed three-dimensional image is improved, as compared with Example 2.

EXAMPLE 5

A deflecting device 14 of yet another arrangement is added to the basic structure.

An ITO strip-electrode illustrated in FIG. 8B is formed on one of the two transparent glass substrates. The strip pattern has a width of 47 μm, and a pitch of 50 μm, and the strips of the ITO electrode are connected by high-resistance wires. Another ITO electrode is formed over the entire surface of the other glass substrate.

An aligning film with a thickness of about 800 Å is formed over each of the glass substrates on the side of ITO electrode by applying a polyamide group material (AL3046-R31 manufactured by JSR Corporation) company) by spin coating. After the annealing process, rubbing is carried out on the strips of the ITO electrode in a perpendicular direction to the strips.

The two glass substrates are held facing each other, and bonded together with a PET Mylar (registered trademark) with a thickness of 20 μm inserted as a spacer between them. After pressurization, the two glass substrates are sealed with a UV-curing adhesive to form an empty cell. A nematic liquid crystal (ZL1-2471 supplied by Merck-Japan) with a positive anisotropic permittivity is injected in the empty cell by capillary phenomena to accomplish a deflecting device shown in FIG. 8.

Since the rubbing directions on the two glass substrates are the same, the liquid crystal molecules are homogeneously aligned parallel to the glass substrates.

A voltage of ±15 V is applied to the deflecting device by a function generator. The input signal is a square wave signal, and the voltage value is measured by a tester. A white laser beam with a flux diameter of 1 mm is emitted toward the deflecting device. The wavelength of the incident beam is adjusted using a wavelength-selective filter (588 nm). A polarizing plate is inserted between the deflecting device and the laser to guide the linearly polarized beam onto the deflecting device having the interlaced comb electrode. The direction of linear polarization is set to be parallel to the longitudinal axis of the strips of the ITO electrode.

The transmitted light is observed by a CCD camera placed at 1 meter from the deflecting device, and it is confirmed that the transmitted light is deflected by application of a voltage.

Then, the light deflector 14 using the deflecting device of Example 5 is added to the basic structure, and the deflecting device is driven, synchronized with the one-pixel shifting operation of the left-eye image and the right-eye image in an oscillating manner to the left and the right on the liquid crystal panel. A high-resolution three-dimensional image, which is clearer than that observed with the basic structure, was observed. In addition, the deflecting device of Example 5 is driven at a lower voltage, as compared with Examples 1 and 2.

As compared with the deflecting device of Example 3 that requires photolithography and dry etching to form a saw-tooth surface in the glass substrate, the deflecting device of Example 5 can be fabricated more easily with a reduced number of processes because the glass substrates with flat surfaces are used.

EXAMPLE 6

A lenticular array is used as the left and right image separator in place of the striped barrier in the basic structure shown in FIG. 9. This substituted basic structure is referred to as the second basic structure. The lenticular lens array has a lens pitch of about 0.2 mm, and is positioned at 1.6 mm distant from the liquid crystal display panel (image display device).

The deflecting device used in Example 1 is added to this second basic structure, and a three-dimensional image is observed in the same manner as in Example 1. Then, a brighter three-dimensional image was observed, as compared with Example 1.

As has been described above, the three-dimensional image display technique according to the first embodiment can improve the horizontal resolution of the displayed three-dimensional image.

Next, the second embodiment of the present invention is described. In the second embodiment, a multiview 3D image display apparatus is provided, which allows a three-dimensional stereo image to be observed at multiple viewpoints.

Figure 11A:
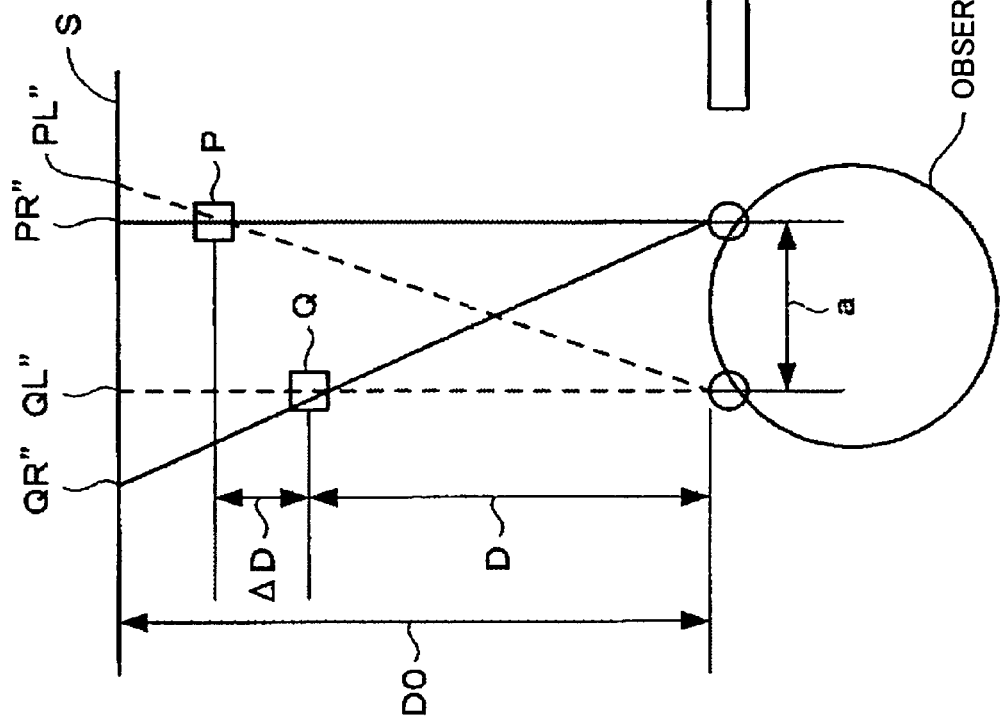
FIG. 11A and FIG. 11B are schematic diagrams for explaining the basic theory of three-dimensional vision.
Figure 11B:
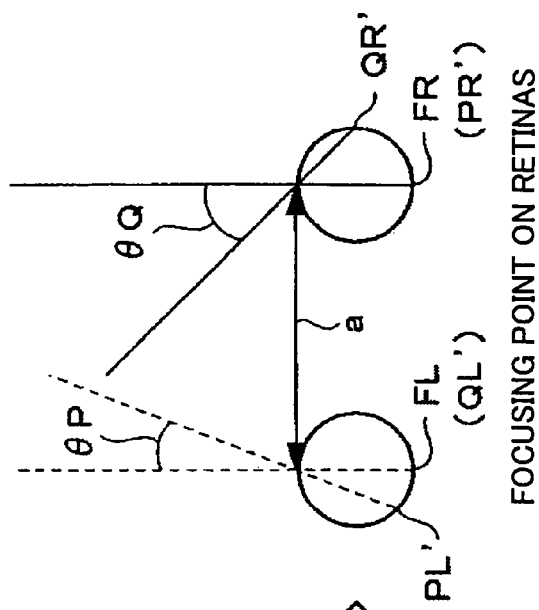

FIG. 11A and FIG. 11B are diagrams for explaining the basic theory of three-dimensional vision. FIG. 11A illustrates the positional relation between multiple objects and the observer's eyes, and FIG. 11B illustrates the positional relation between the incident angle of light with respect to the eyes and the focusing positions on the retinas.

The symbol "a" denotes the eye separation of the observer Z, P and Q denote objects, D denotes the distance from an object, and S denotes the screen or the surface of display panel.

When the observer Z watches object P positioned in front of the right eye, the image of the object P is focused on PR' on the retina of the right eye of the observer Z, which is in agreement with the center FR of the retina. On the other hands, the image of object P is focused on PL' slightly offset from the center FL on the retina of the left eye of the observer Z due to the eye separation a, as illustrated in FIG. 11B. For the right eye of the observer Z, the object P appears to be located straight forward, but for the left eye, the object P appears to be situated nearer the right eye.

Similarly, when the observer Z watches object Q located in front of the left eye, the image of the object Q is focused on QL' at the center on the retina of the left eye, while the image is focused on QR' slightly offset from the center on the retina of the right eye. For the left eye of the observer Z, the object Q appears to be located straight forward, but for the right eye, the object Q appears to be situated nearer the left eye.

In this manner, the position of the object image on the retina differs between the left eye and the right eye. This slight difference between the viewpoints on the left eye and the right eye is called binocular parallax.

By making use of the binocular parallax and giving important information about the depth of an object to the screen (panel surface) S, the object can be viewed three-dimensionally. To reproduce the objects P and Q in the screen at a distance D0 from the observer's eyes, the left-eye image of object P is formed at PL" on the screen and the right-eye image of the object P is formed at PR" on the screen, as illustrated in FIG. 11A. Similarly, the left-eye image of object Q is formed at QL" on the screen and the right-eye image of the object Q is formed at QR" on the screen.

Figure 12B:
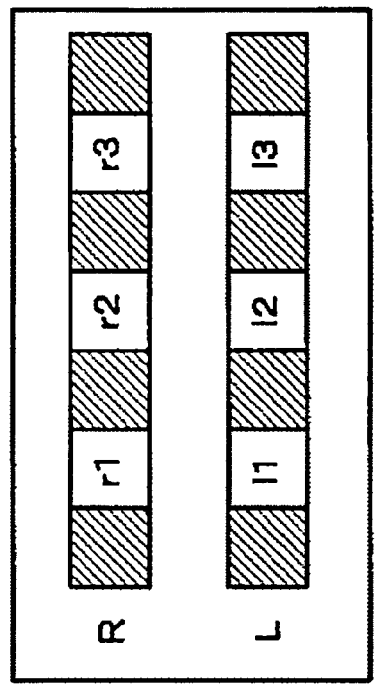
FIG. 12A and FIG. 12B illustrate an example of an image separator for guiding a left-eye image and a right-eye image separately to the left eye and the right of the observer, respectively.
Figure 12A:
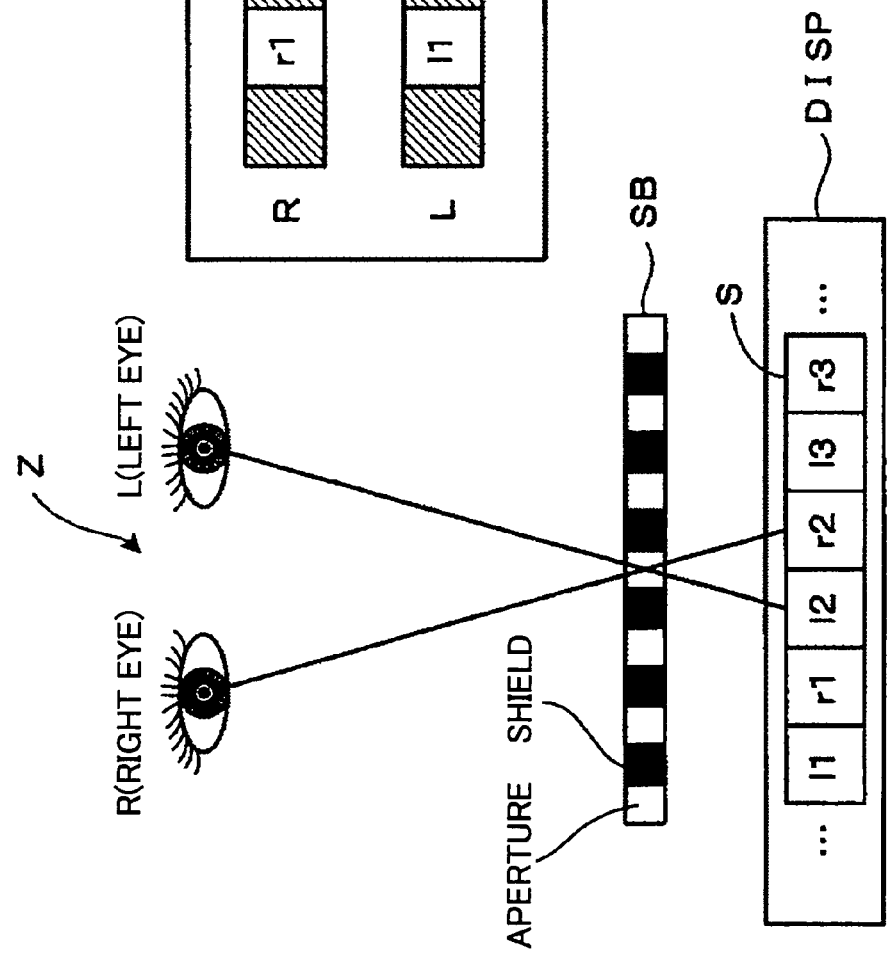

FIG. 12A illustrates an example of an image separator for guiding a left-eye image and a right-eye image on the image display device (DISP) to the left eye and the right eye, respectively, of the observer Z. FIG. 12B illustrates a set of left-eye pixels and a set of right-eye pixels perceived by the left eye and the right eye, respectively, of the observer Z. In this example, a slit barrier SB (or a parallax barrier with striped filters) is used as the image separator.

A number of strip pixels for a left-eye image and a right-eye image are arranged alternately on the image display device DISP. The observer Z views an image at a distance D0 from the display screen S. The slit barrier SB positioned in front of the screen S is configured such that the left-eye image and the right-eye image on the display DISP are perceived separately by the left eye and the right eye of the observer Z, respectively. Accordingly, the observer Z perceives the composite of these images as a three-dimensional image due to binocular parallax.

The left-eye image is formed by the left-eye pixels ln and the right-eye image is formed by the right-eye pixels rn, wherein n is a natural number (n=1, 2, 3, ... ). The right-eye pixel r1 and the left-eye pixel l1 are illustrated at the same position in FIG. 12B, which indicates that the left eye and the right eye perceive that the pixels r1 and l1 are at the same position. The position that allows the observer to see the entire image is called a viewpoint or an eye view. In the example shown in FIG. 12A, there are two viewpoints, which are the positions of the left eye and the right eye.

When using a slit barrier SB, the resolution of the three-dimensional image is determined by the pitch of the aperture of the slit barrier. The area blocked by the striped shield of the slit barrier SB cannot be seen. Accordingly, the images perceived by the left eye and the right eye are intermittent, and the observer feels that the horizontal resolution is low.

FIG. 13A and FIG. 13B illustrates an example of the image separator. In this example, a lenticular lens LL consisting of a plurality of cylindrical lenses is used, in place of the slit barrier, to guide the left-eye image and the right-eye image formed on the image display device (DISP) separately to the left eye and the right eye, respectively, of the observer Z. The left-eye image and the right-eye image on the display device DISP are formed by a number of strip pixels arranged alternately in the horizontal direction. Each image from one of the strip pixels is magnified by the lenticular lens LL in the left-to-right direction, and each of the left-eye image and the right-eye image appears to be continuous. Accordingly, the resolution of the image is determined by the pitch of the lenticular lens LL.

Figure 14A:
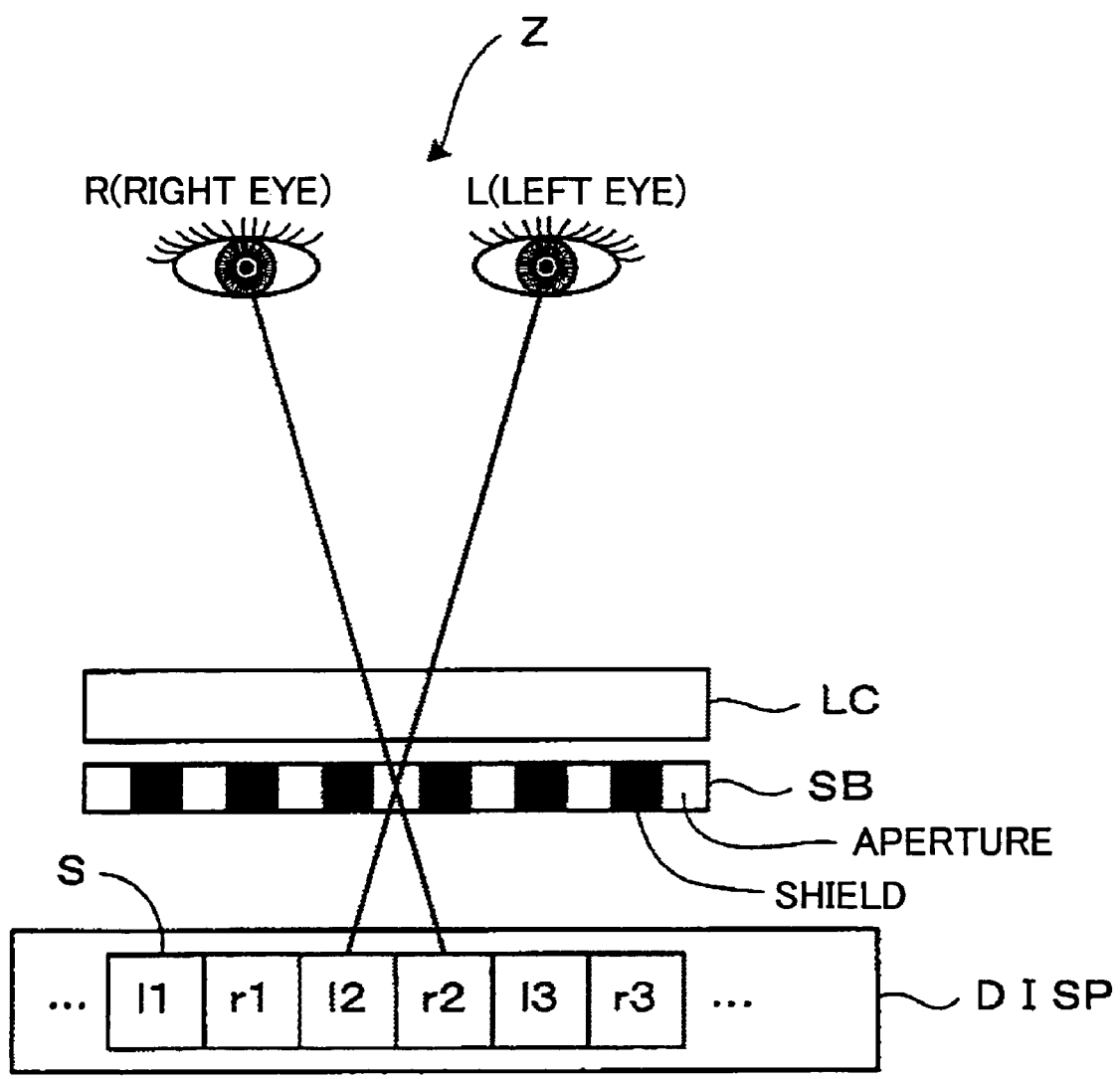
FIG. 14A and FIG. 14B are diagram for explaining improvement of the resolution achieved by time-dividing optical deflection.
Figure 14B:
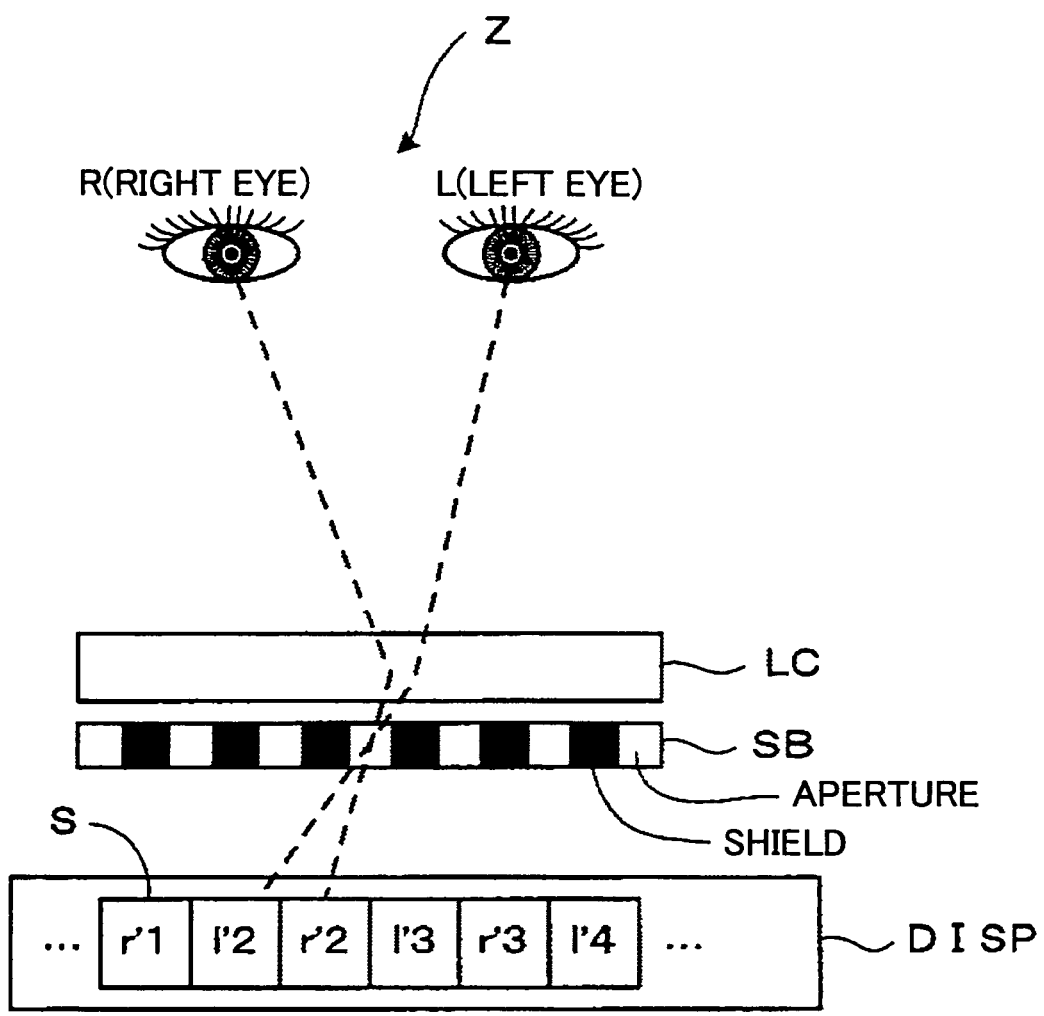

FIG. 14A and FIG. 14B illustrate improvement of the resolution by deflecting the light image in a time-dividing manner. The first state shown in FIG. 14A and the second state shown in FIG. 14B following immediately after the first state are switched repeatedly.

In the first state shown in FIG. 14A, a light deflector LC placed in front of the slit barrier SB is not activated so as to allow the light O from the image display device DISP to pass through the apertures of the slit barrier SB without deflection.

Then, in the second state shown in FIG. 14B, the pixel position on the display device DIP is one-pixel shifted to the right or the left, and the light deflector LC is activated to deflect the light from the pixels so as to guide the left-eye image and the right-eye image to the left eye and the right eye, respectively, of the observer. Upon activation of the light deflector LC, an image (referred to as a hidden image) O' at a position blocked by the slit barrier SB is displayed on the image display device DISP. At this time, the position of the hidden image is shifted by one pixel to the left in the example shown in FIG. 14B. The image O', which is hidden by the slit barrier SB during the display of image O, is now seen as if it were located at the shielded location.

By switching on and off the optical deflection at a high rate, and by switching the image O and the hidden image O' while shifting the image position by one pixel, a continuous high-resolution image can be perceived at each of the observer's eyes. The resolution of the resulting three-dimensional image is also high, as illustrated in FIG. 15.

Figure 15:
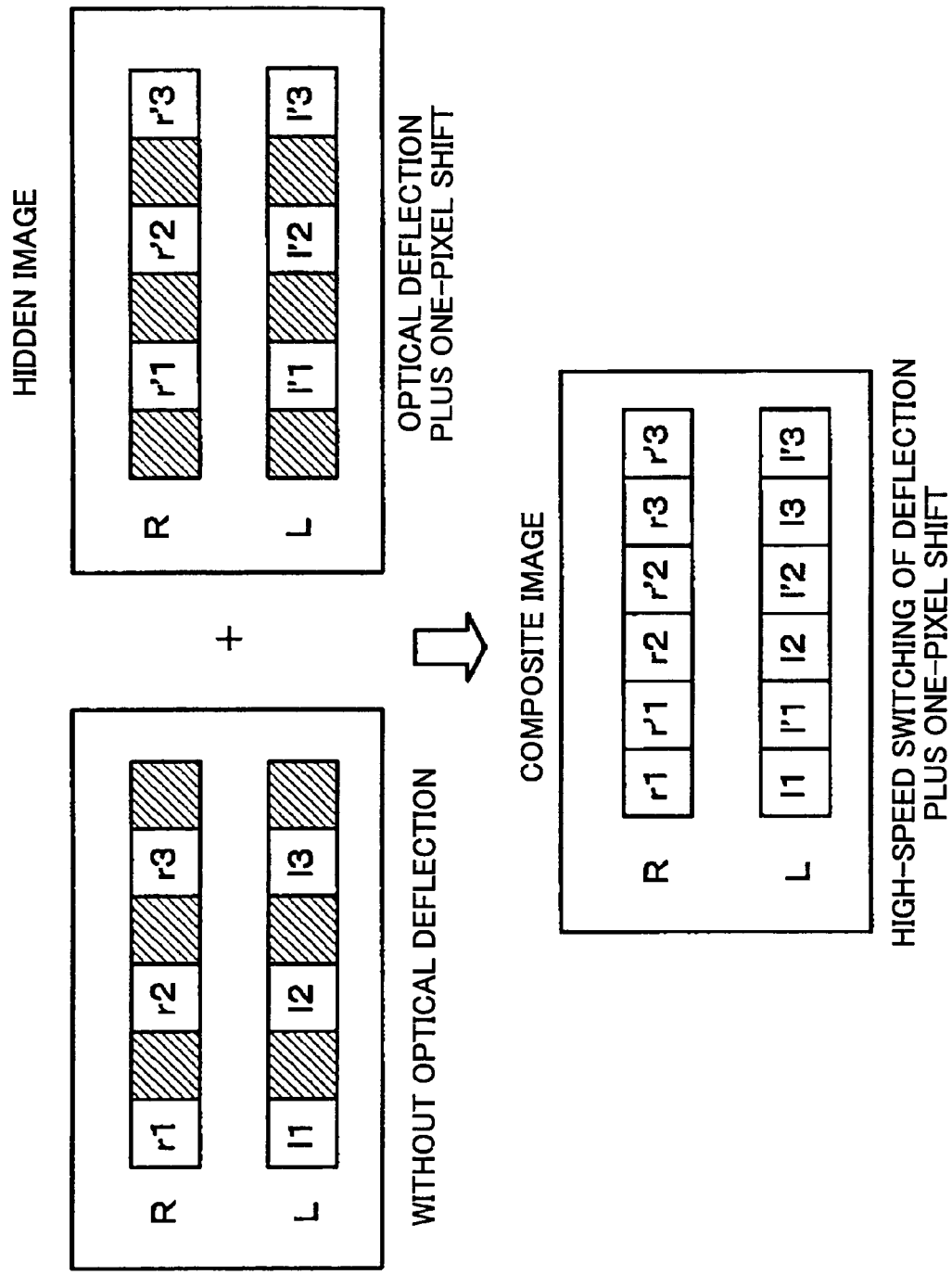
FIG. 15 illustrates a composite image obtained by repeatedly switching between the first state shown in FIG. 14A and the second state shown in FIG. 14B.

In FIG. 15, the left-eye image and the right-eye image are guided to the left eye and the right eye, respectively, of the observer without deflection in the first state. In the second state, the previously hidden and one-pixel shifted left-eye image and right-eye image are guided through optical deflection to the left eye and the right eye, respectively, of the observer. The first state and the second state are switched at a high rate to produce a high-resolution composite image.

If the hidden image O' is not used, and if the previous image O is simply shifted to the left by one pixel, then the resolution of the displayed image is not increased. In this case, the images shown in FIG. 13B are perceived.

Figure 16:
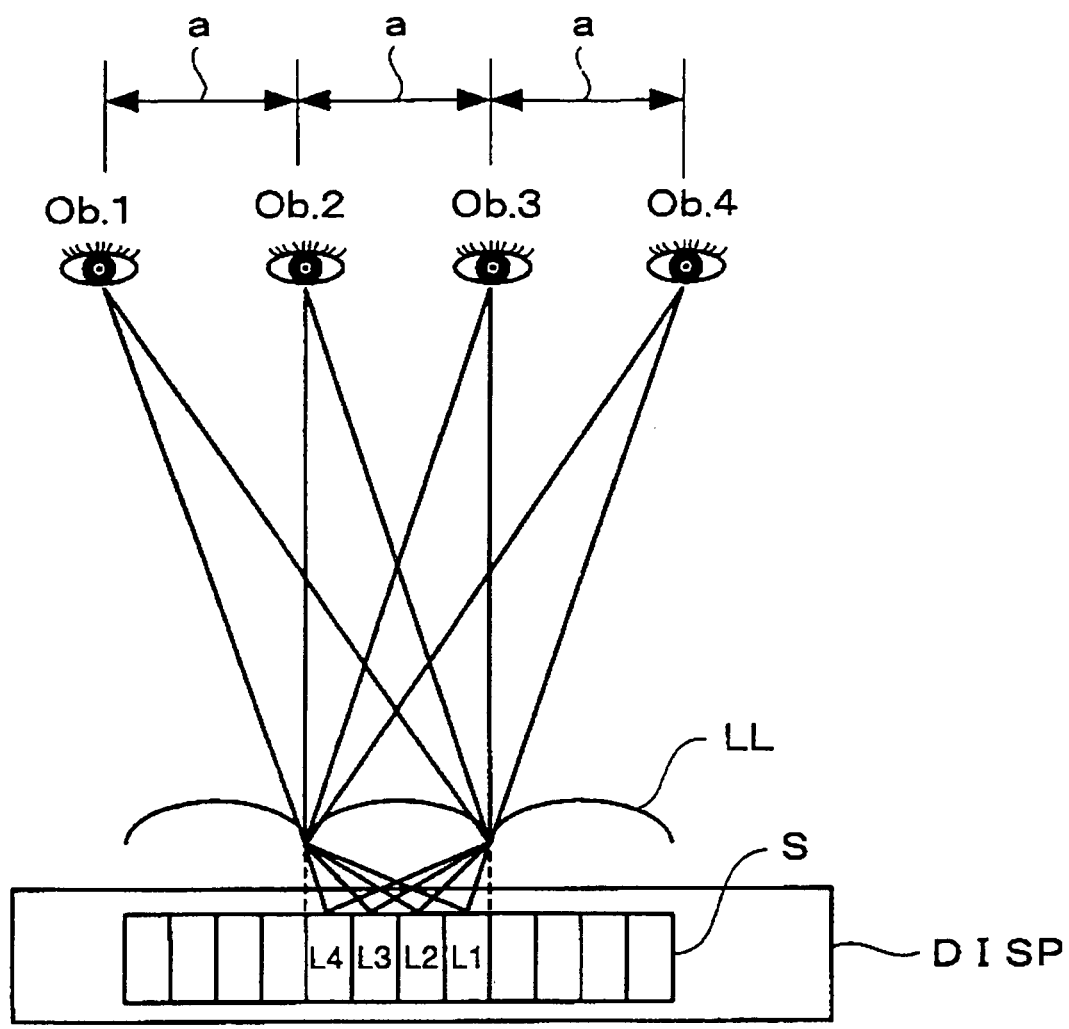
FIG. 16 is a schematic diagram for explaining the basic concept of a 3D image display apparatus with four observation points of view.

FIG. 16 shows an example of a conventional multiview 3D image display apparatus, which allows a three-dimensional image to be observed at three different observing locations. In FIG. 16, the symbol L denotes a pixel, and Ob denotes the eye view (or the viewpoint).

Multiple input images formed corresponding to the multiple viewpoints are guided to the multiple observing locations.

There are four viewpoints Ob1 through Ob4 in the example shown in FIG. 16. The separation between the observation points is "a", which is substantially the same as separation a shown in FIG. 11. When observing a convex lens surface of the lenticular lane LL, one of the four pixel images L1 through L4 is observed at each of the viewpoints Ob1 through Ob4. For example, pixel image L1 is observed from the viewpoint Ob1.

The pixels images L1 through L4 are formed so as to correspond to the respective viewpoints Ob1 through Ob4. If the right-eye and the left eye of an observer are positioned at Ob1 and Ob2, respectively, the observer can see a three-dimensional image generated by the images L1 and L2. Similarly, a three-dimensional image generated by images L2 and L3 is observed at the observing location with the viewpoints Ob2 and Ob3, and a three-dimensional image generated by images L3 and L4 is observed at the observing location with the viewpoints Ob3 and Ob4. Accordingly, the three-dimensional image can be seen from three different locations. The image observed in this state is that shown in FIG. 13B.

Figure 17:
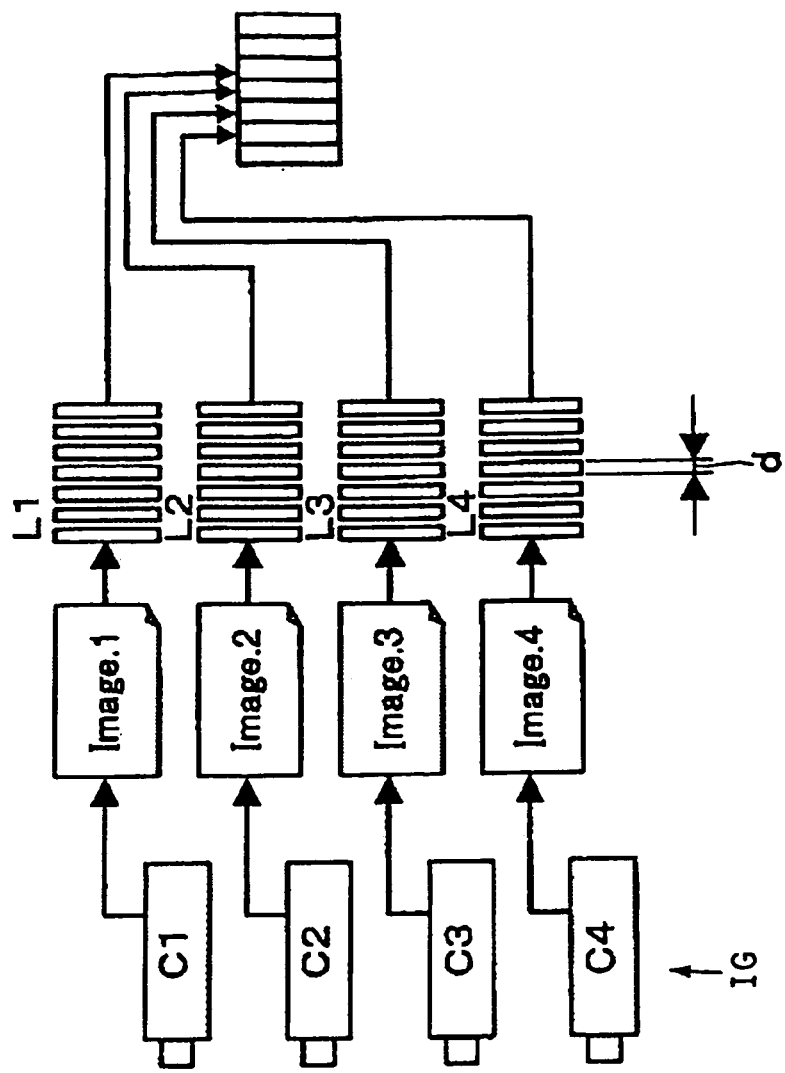
FIG. 17 is a schematic diagram for explaining how a three-dimensional image is created with the apparatus shown in FIG. 16.

FIG. 17 is a schematic diagram for explaining how the three-dimensional image shown in FIG. 16 is produced. In FIG. 17, the symbol C denotes a camera.

To acquire input images, multiple cameras (four cameras in this example) C1-C4, operating as an image generator IG, are placed at a prescribed interval and the photographed images are processed. The camera positions correspond to the viewpoints during the observation. The four cameras photograph the subject and produce four images 1 through 4. Each of the images is divided into multiple components so as to have a width "d", which is determined by the pitch of the lenticular lens and the spatially dividing number (four in this case). The divided images created from images L1-L4 are arranged sequentially to generate the input image to the image display device.

As the number of observing locations increases, the convenience is improved because many observers can utilizes the apparatus at the same time. In addition, as the viewpoint moves, the observation angle for the subject also changes, and the image can be perceived as a natural three-dimensional image. However, as the number of observing locations increases, the substantive resolution drops. In the example shown in FIGS. 16 and 17, each observer feels a quarter (¼) of the resolution of the image display device. Accordingly, an improved multiview three-dimensional image display technique that allows a three-dimensional image to be viewed at many observing locations without causing degradation of resolution is required.

Figure 18:
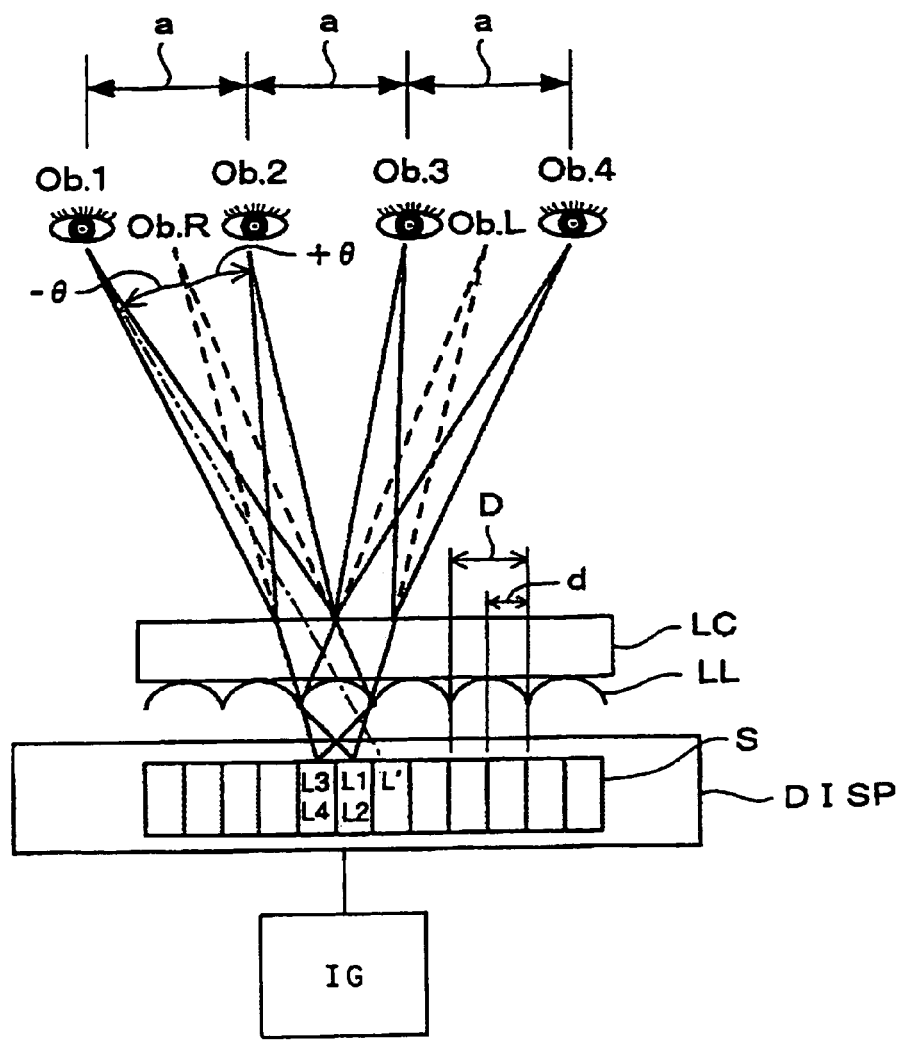
FIG. 18 illustrates a mutliview 3D image display apparatus according to the second embodiment of the invention.

FIG. 18 illustrates a multiview 3D image display apparatus according to the second embodiment of the invention. The multiview 3D image display apparatus has a light deflector (LC) placed in front of the lenticular lens (LL). In other words, the multiview 3D image display apparatus includes an image display device (DISP), an image separator (LL) placed in front of (on the observer's side of) the image display device, and a light deflector (LC) configured to deflect the light image having passed through the image separator according to the expected observing locations. The image display device receives multiple input images generated corresponding to the multiple viewpoints, and displays a spatially-time-divided image component.

The spatially dividing number is a number by which a unit display area (redulated by a cylindrical lens element in FIG. 16) of the image display device is divided. The spatially dividing number is set to four (4) in the example shown in FIG. 16. The time dividing number is a number by which a prescribed time is divided to display two or more images on the image display device in a time dividing manner. In the example shown in FIG. 18, the spatially dividing number L is two (2), the time dividing number m is two (2), and the number of input images is four (4).

In the non-deflecting state in which the light deflector is not activated, the outgoing beam from the image display device follows the light path indicated by the dashed line. It is assumed that the viewpoints for this outgoing beam are at Ob. L and Ob. R. When the light deflector is activated, the incident beam on the light deflector is deflected (or rotated) by angle θ clockwise or counterclockwise, depending on the control signal supplied to the light deflector.

For example, the light deflector is activated, and the light path toward Ob. R is deflected by angle -θ so as to reach the viewpoint Ob. 1. Similarly, the light path toward Ob. L is deflected by -θ so as to converge to the viewpoint Ob. 3. In synchronization with this deflection switching, divided images L1 and L3 are formed on the image display device at prescribed positions.

Figure 19:
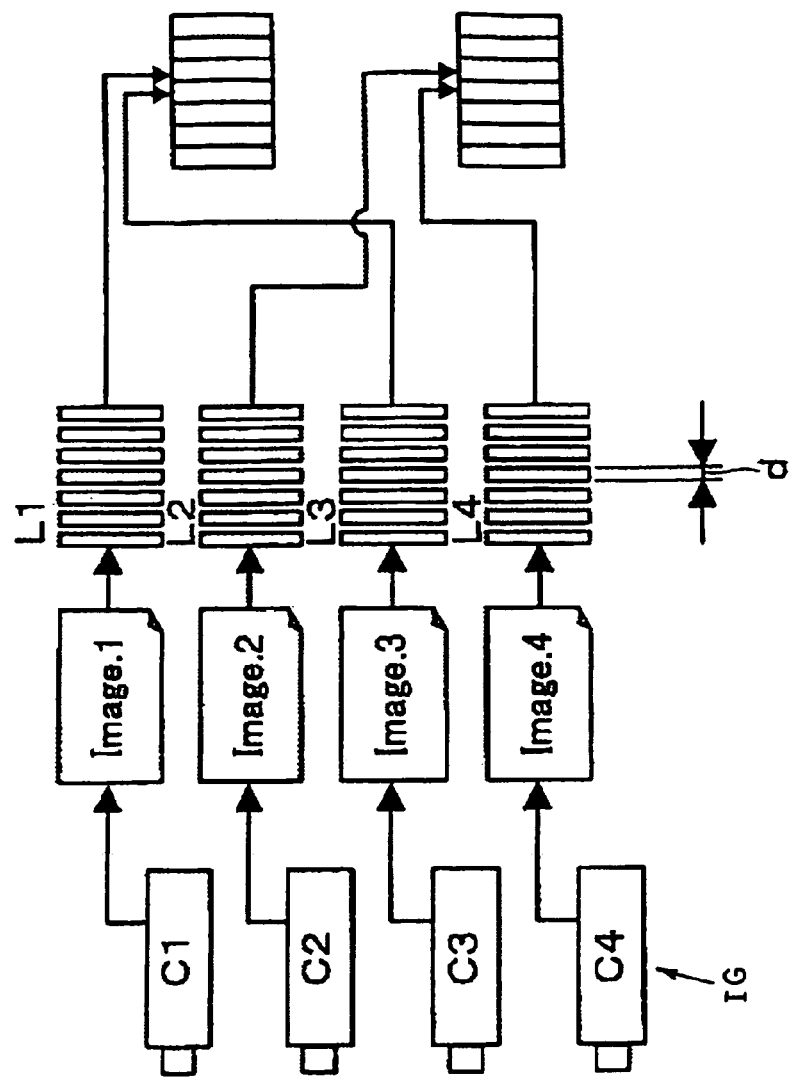
FIG. 19 is a schematic diagram for explaining how a three-dimensional image is created with the apparatus shown in FIG. 18.

The input image to the image display device is generated by the image generating unit shown in FIG. 19. With this image generating unit, the images L1 and L3 are spatially divided and are merged in advance.

Figure 20:
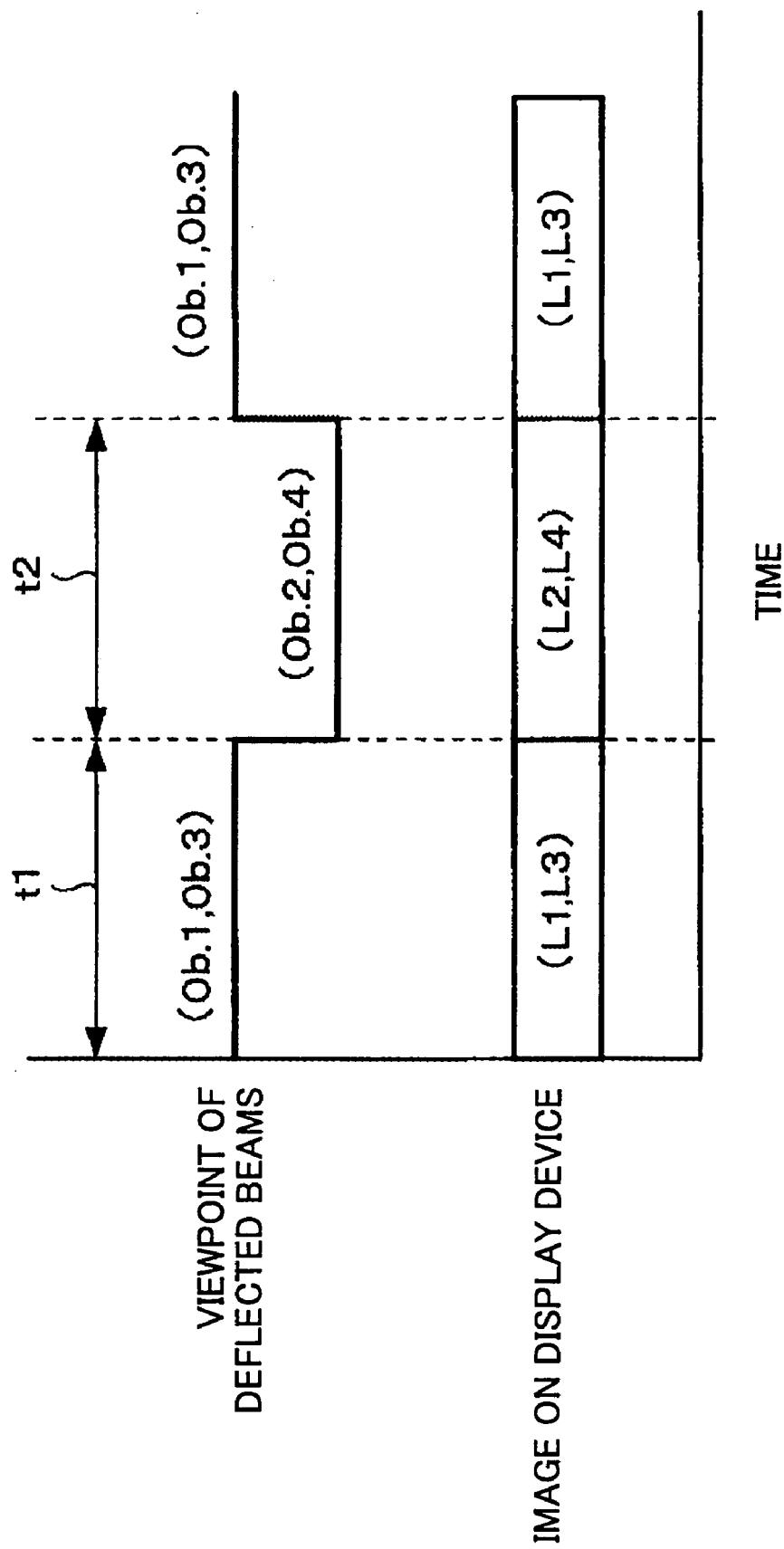
FIG. 20 is a timing chart showing the relation between the deflection switching timing and the images formed on the display device in the multiview 3D image display apparatus of FIG. 18.

FIG. 20 is a timing chart showing the relation between the deflection switching timing and the images formed on the image display device. The images L1 and L3 are displayed on the image display device for time T1, and at the same time, the beams from the image display device are deflected to and maintained at viewpoints Ob1 and Ob2 for time t1. This state is referred to as the first state. Then, the light deflector is activated to the opposite direction in order to bring the light paths to Ob. R and Ob. L toward the viewpoints Ob. 2 and Ob. 4, respectively, by deflecting the beam by +θ from the reference position, as illustrated in FIG. 18. In synchronization with the deflection switching operation, images L2 and L4 are formed on the image display device at prescribed positions. Images L2 and L4 are spatially divided and are merged in advance by the image generating unit shown in FIG. 19. This state (second state) is maintained for time t2, as illustrated in FIG. 20. Then, the first state is maintained again for time t1. The switching between the first and second states is repeated. Thus, the input image pair L1 and L3 and the input image pair L2 and L4 are displayed in a time dividing manner.

In this manner, the multiview 3D image display apparatus shown in FIG. 18 can have double viewpoints without reducing the resolution of the image, simply by adding the light deflector to the conventional structure shown in FIG. 13. It is desired to set time t1 and t2 to sufficiently short such that the observer does not perceive flicker. For example, 1 and t2 are set to 16.7 ms (corresponding to 30 Hz).

If the spatially dividing number is L and if the width of the divided region on the image display device is d, then the pitch Ds of the image separator is set to the products of L and d (Ds=L*d). By configuring the image separator so as to have a periodically varying shape, index of refraction, or the transmissivity at pitch Ds, a satisfactory three-dimensional image can be obtained with less leakage of light.

When dividing and merging the input image, it is preferable to arrange the image by slightly shifting the image position taking into account the deflection of the light path in the deflecting device of the light deflector. For example, in FIG. 18, the image guided to the viewpoint Ob. 1 is image L1 from the divided region labeled as L1. However, it is perceived at the viewpoint Ob. 1 that the image exists at position L' slightly to the right side of the region L1. Accordingly, it is desired for the pixel signal for image L1 to represent an image corresponding to a location L'.

The focal length or the observing distance is appropriately set depending on the screen size of the image display device and the expected number of observers. For example, it may set in a range from 0.5 m to 5 m. As the periodic structure used in the multiview 3D image display apparatus, a lenticular lens array is superior from the standpoint of controllability of fabrication and the light use efficiency.

Figure 21:
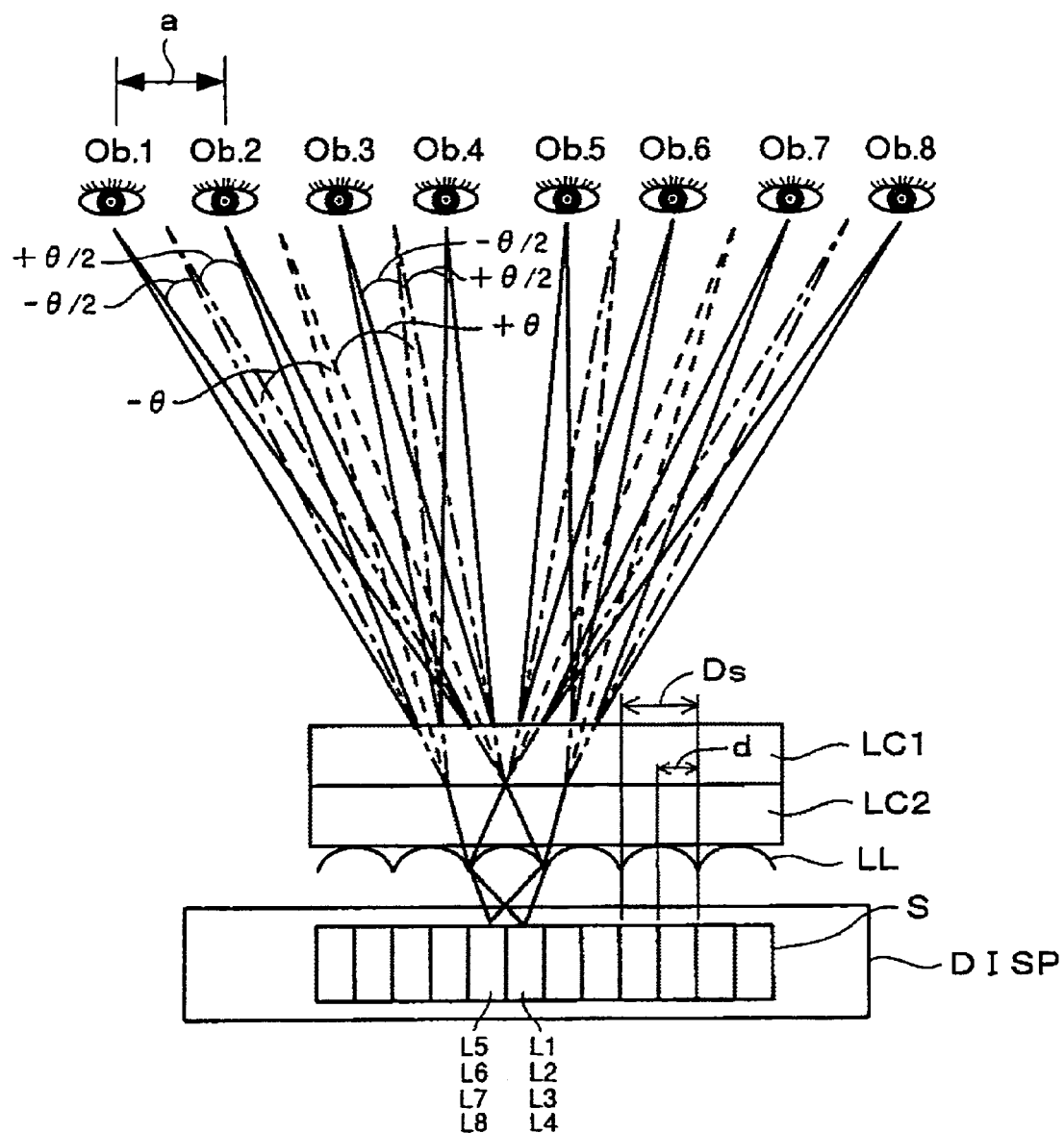
FIG. 21 shows another example of the multiview 3D image display apparatus according to the second embodiment of the invention, in which two-tiered light deflector is used.

FIG. 21 illustrates another example of the multiview 3D image display apparatus with multiple viewpoints according to the second embodiment. In this example, a two-tiered light deflector is used.

In the example shown in FIG. 18, the light path is deflected toward two different locations (e.g., Ob R swings between Ob. 1 and Ob. 2, and Ob. L swings between Ob. 3 and Ob. 4). However, the light path may be deflected to more observing locations. By superposing another light deflector on the previously provided light deflector, and by setting the angle of deflection to ±θ/2, the viewpoints can be increased to four (4), while maintaining the separation. In this case, seven (7) observing locations can be obtained by bringing the left and right eyes to locations (Ob. 1/Ob. 2), (Ob. 2/Ob. 3), . . . , and (Ob. 7/Ob. 8), corresponding to images L1 through L8.

Although not shown in the figure, the number of viewpoints may be further doubled, while maintaining the separation, by superposing still another deflecting device and setting the angle of deflection to ±θ/4. If the angle of deflection of the reference deflecting device has a reference angle of deflection θ0, and if k deflecting devices are added to the reference deflecting device, then the angle of deflection θj of the $j^{th}$ deflecting device is expressed as $(\frac{1}{2})^j * θ0$ (where j=1, 2, . . . , k). The order of superposing deflecting devices is not necessarily consistent with the order of size of the deflection angle.

In the above-described example, the number of target positions to which the beam is deflected by the deflecting device is set to 2, 4, and 8. If the time dividing number m is set equal to the number of target positions, a satisfactory three-dimensional image without interruption or uneven brightness can be reproduced. However, it should be noted that if the time dividing number becomes too large, the image may degrade unless a sufficiently fast-switching deflecting device is employed.

Figure 22:
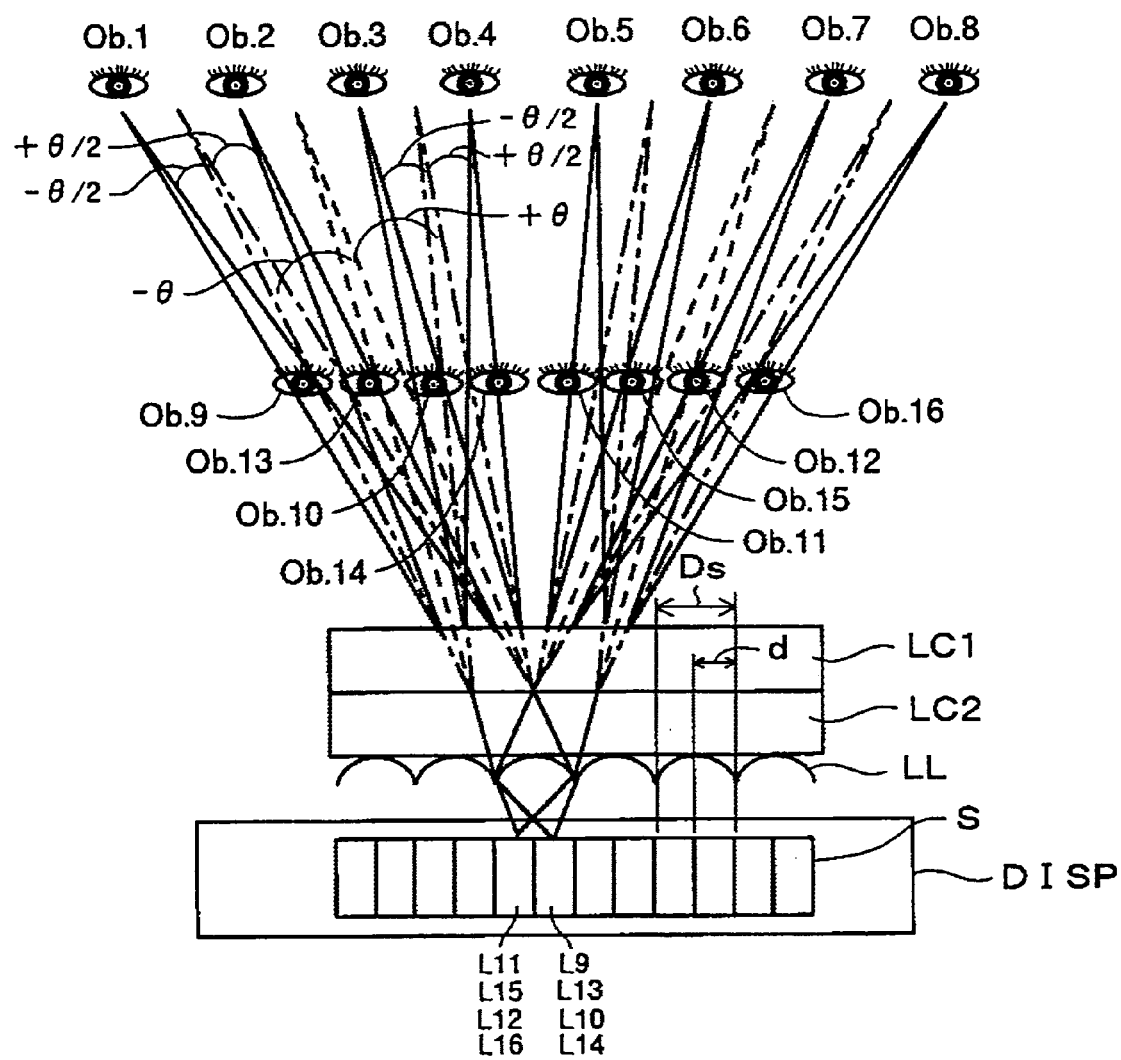
FIG. 22 shows still another example of the multiview 3D image display apparatus according to the second embodiment of the invention, in which the resolution at the observing point is increased.

FIG. 22 illustrates still another example of the multiview 3D image display apparatus according to the second embodiment. In this example, the resolution at the observing location is improved.

In order to increase the number of observing location, it is effective to increase the spatially dividing number, in place of or in addition to increasing the time dividing number. In the example shown in FIG. 18, the four images L1 through L4 are rearranged into two halved images. If the spacially dividing number L is set to four (4) as illustrated in FIG. 16, and the time dividing number m is set to two (2), then the number of observing location can be increased up to eight (8). Setting the number of observing locations to m*L is a condition for guaranteeing increased number of observing locations efficiently. In this case, the number n of input images prepared in advance is m*L. The numbers m and L are not necessarily even numbers.

In the example shown in FIG. 21, seven (7) observing locations can be obtained by bringing the left and right eyes to (Ob. 1/Ob. 2), (Ob. 2/Ob. 3), . . . , (Ob. 7/Ob. 8). In addition to this arrangement, the example shown in FIG. 22 can change the distance from the image display device to the observer. In this example, the newly added observing locations are six (6) at (Ob. 9/Ob. 10), (Ob. 10/Ob. 11), (Ob. 11/Ob. 12), (Ob. 13/Ob. 14), (Ob. 14/Ob. 15), and (Ob. 15/Ob. 16).

If the input images suitable to the arrangement shown in FIG. 21 is applied to the structure shown in FIG. 22 as it is, the displayed image appear artificial because the stereoscopic effect is emphasized too much. To avoid this, the input images have to be taken at double density, as compared with the arrangement shown in FIG. 21. To be more precise, the number of cameras is unchanged, but the interval between adjacent cameras is set to half. By doing this, a normal three-dimensional image can be observed at location (Ob. 9/Ob. 10). If the observing location is shifted by half of the eye separation (a/2), a different three-dimensional image can be observed. Thus, the resolution at the observing location is improved.

The deflection switching timing of the deflecting device is synchronized with the image rewriting timing of the image display device, as illustrated in FIG. 20. This arrangement is advantageous because image fluctuation or blurring due to deflection switching can be reduced.

Figure 23:
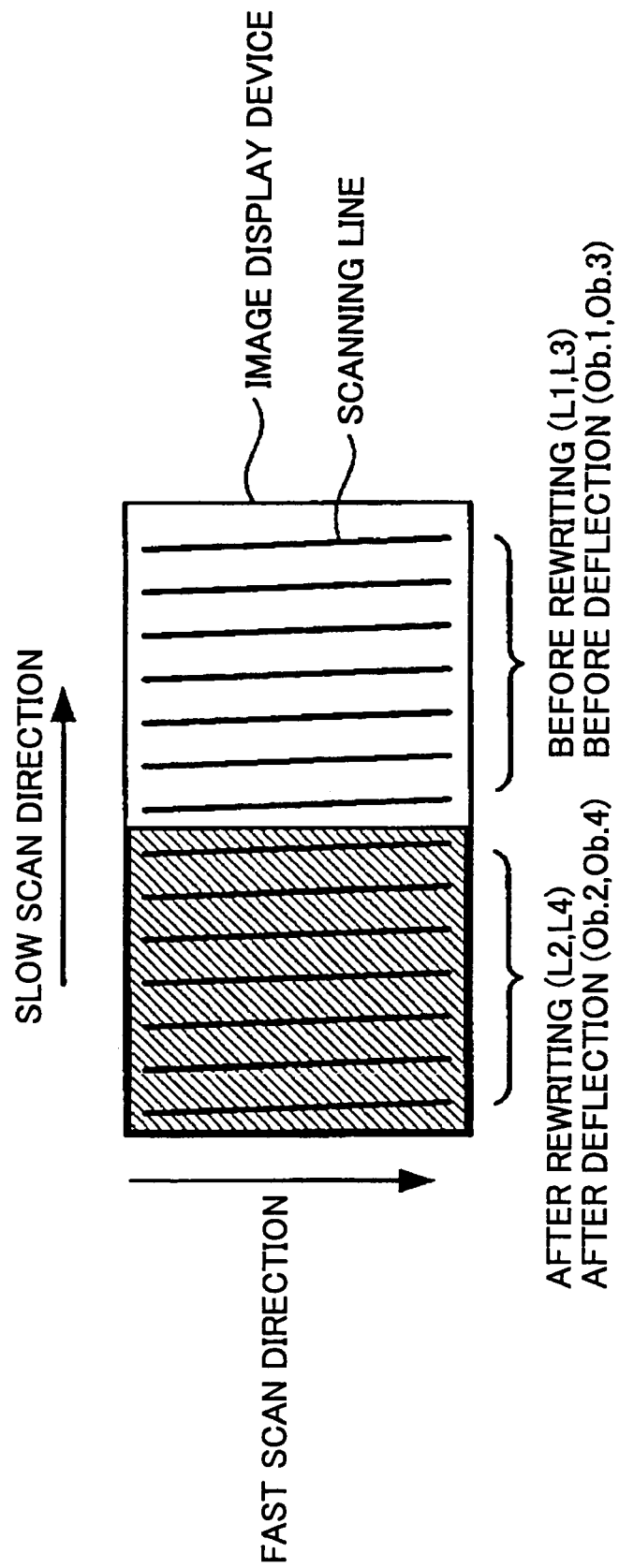
FIG. 23 is a schematic diagram for explaining how the image is rewritten on the image display device.

FIG. 23 illustrates an example of rewriting the images on the image display device. It is preferable for an image on the image display device to be rewritten collectively at all the pixels because a line-sequential or one-pass rewriting method takes time for rewriting from the first pixel to the last pixel. With the line-sequential or one-pass rewriting method, if the deflection switching timing is set to the rewriting timing of the first pixel, the last pixel is blurred, and vice versa.

However, if a line-sequential rewriting image display device is used, it is desired that the fast scanning direction be the vertical, that is, perpendicular to the deflecting direction. In this case, if the slow scan is carried out from the left to the right, the beam is also deflected from the left to the right synchronized with the slow scan. This arrangement can reduce the image fluctuation or blurring.

The image display device is of a direct-view type, such as liquid crystal display panels, plasma display panels, or electroluminescence display panels. Alternatively, it may be of a projection type, such as liquid crystal projectors or DLPs. Among the direct-view type display device, liquid crystal display panels are preferable because positioning of the image separator/condenser with respect to the divided image regions of the image display device can be performed easily. In addition, high-resolution liquid crystal display panels are commercially available, as compared with other products of the direct-view type, and a high-resolution three-dimensional image can be obtained.

Figure 24:
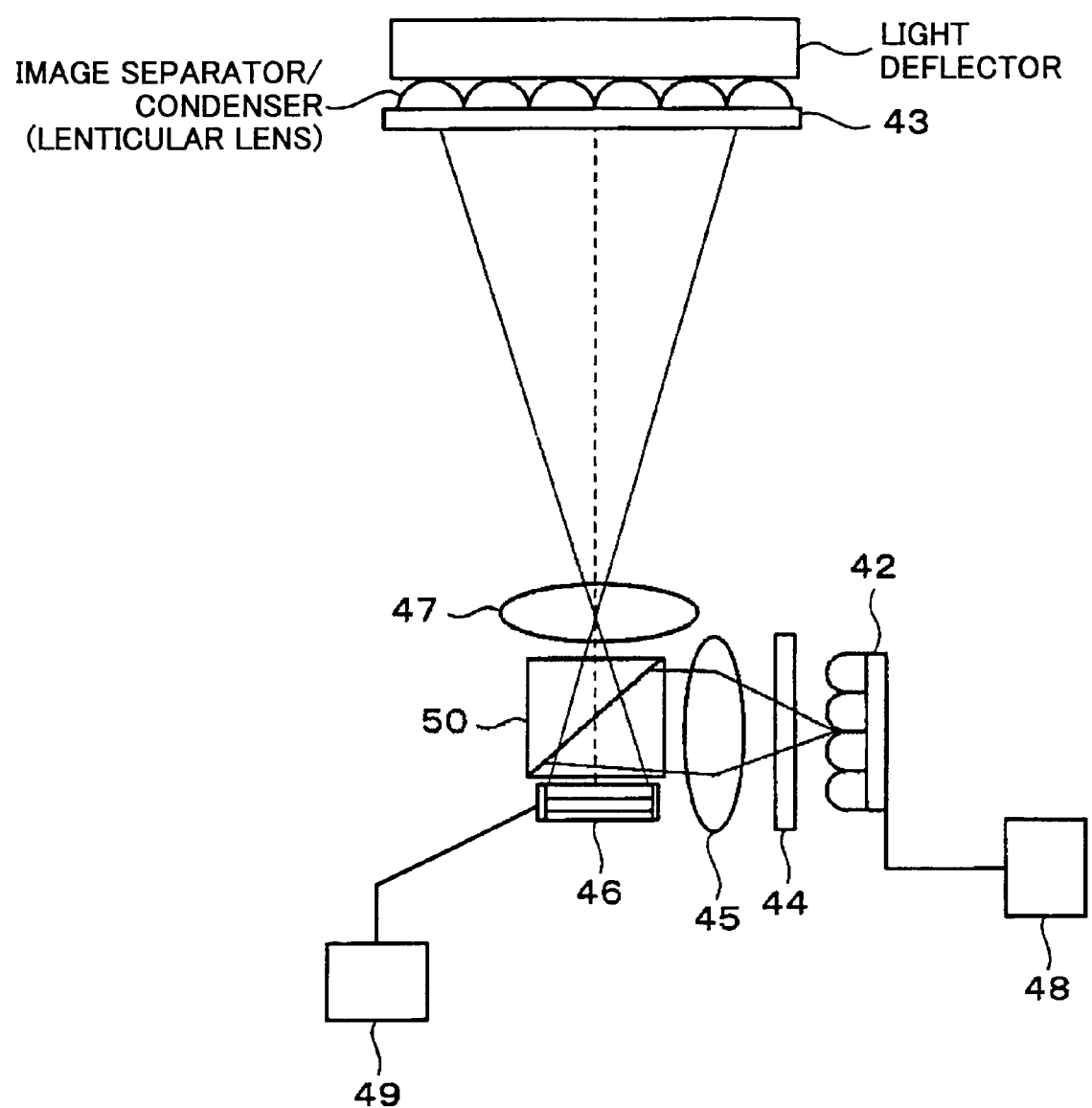
FIG. 24 shows the cross-sectional structure of a 3D image display apparatus using a single-panel projection display.

FIG. 24 shows a structural example of the 3D image display apparatus using a 1CC projector/display. The apparatus includes a light source 42, a screen 43, a diffusing plate 44, a condensing lens 45, liquid crystal on silicon (LCOS) 46 functioning an image display device, a projection lens 47, a light source driving unit 48, an LCOS driving unit 49, and a polarization beam splitter 50.

It is advantageous to employ LCOS as the projection type display device because the LCOS has a comparatively fast rewriting speed and is suitable for producing a high-resolution image. In this example, the 3D image display apparatus employs a 1CCD projector/display. The light source 42 has a two-dimensional LED array.

An illuminating beam is emitted from the light source 42 under the control of the light source driving unit 48, and is uniformly diffused by the diffusing plate 44. The uniformly diffused beam is guided onto the LCOS 46 as critical illumination via the condensing lens 45 and the beam splitter 50. The LCOS 46 is regulated by the liquid crystal driving unit 49 synchronized with the light source. The illumination beam is subjected to spatial light modulation at the LCOS 46, magnified by the projection lens 47, and projected onto the screen 43. The illumination beam further passes through the image separator and the light deflector to reproduce a three-dimensional image for the observer.

Figure 25A:
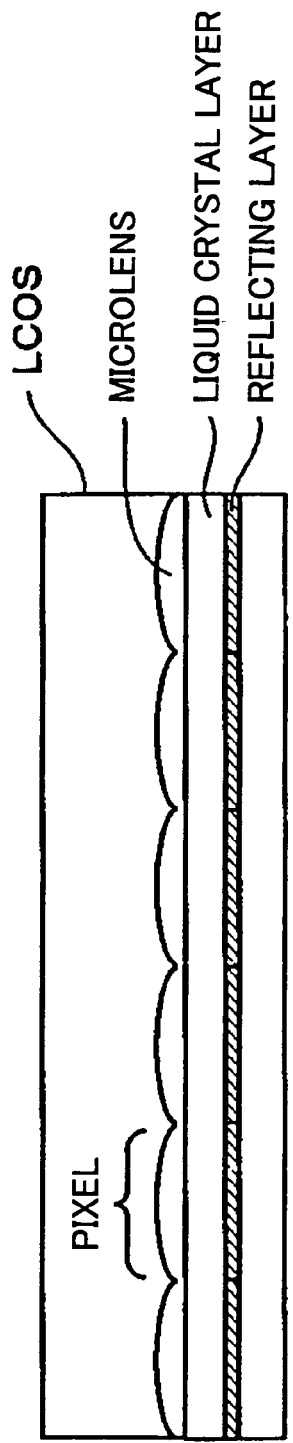
FIG. 25A and FIG. 25B illustrate the cross-sectional structure of Liquid Crystal on Silicon (LCOS)
Figure 25B:
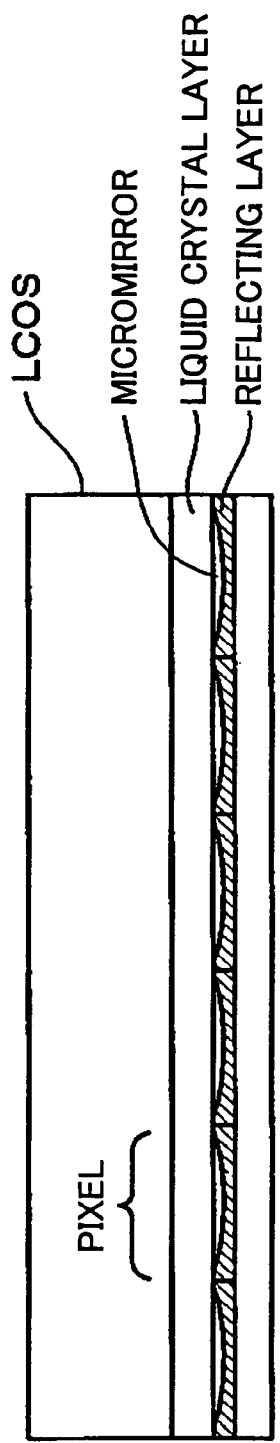

FIG. 25A and FIG. 25B are examples of the LCOS used in FIG. 24. The LCOS shown in FIG. 25A has a microlens, and the LCOS shown in FIG. 25B has a micromirror.

Focusing on the divided image region forming images L3 and L4 on the image display device shown in FIG. 18, the outgoing beam exiting from this divided image region strikes the corresponding lens element of the image separator. However, if a portion of the beam exiting from the divided image region is incident on an adjacent lens element, a g ghost image is generated. To avoid this, an aperture regulator is provided for each pixel of the image display device. The microlens and the micromirror shown in FIG. 25A and FIG. 25B, respectively, function as the aperture regulator. It is preferable to use a microlens because the existing circuit of a conventional LCOS can be used as it is.

Figure 28:
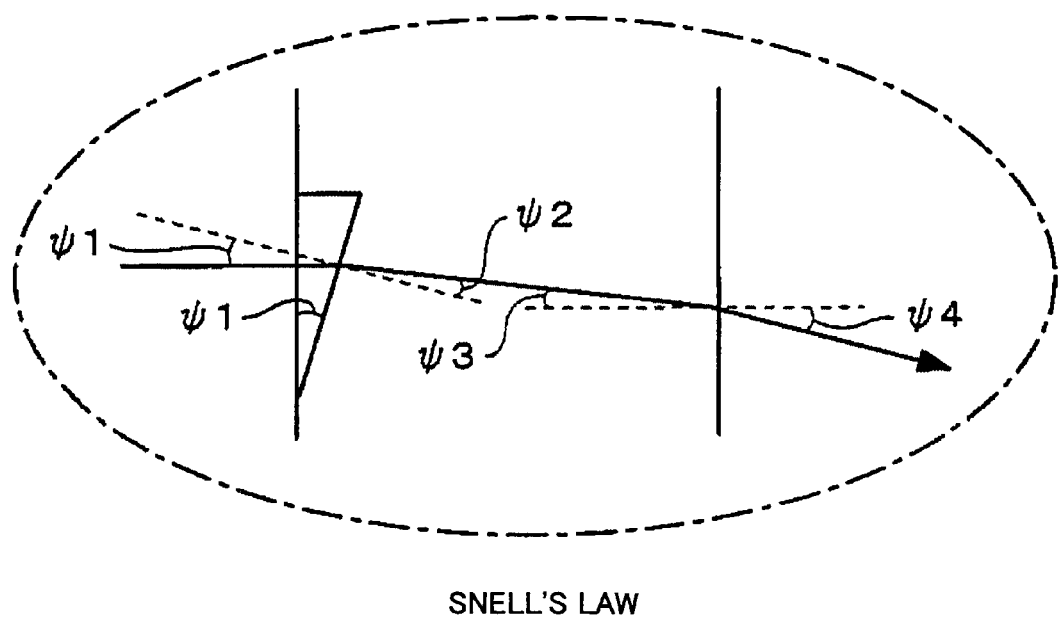
FIG. 28 illustrates deflection of a perpendicularly incident beam on the deflecting device.

FIG. 26 through FIG. 28 illustrate an example of the deflecting device used in the light deflector of the multiview three-dimensional image display device of the second embodiment. This deflecting device is similar to that shown in FIG. 6 used in the first embodiment.

Figure 26A:
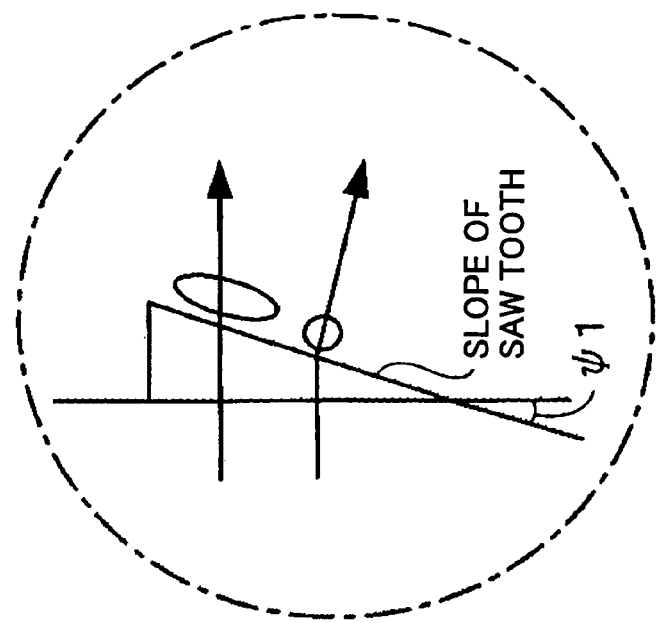
FIG. 26A and FIG. 26B illustrate an example of the deflecting device used in the multiview 3D image display apparatus of the second embodiment.

As illustrates in FIG. 26A, the deflecting device has a pair of transparent substrates, a chiral smectic C phase or nematic phase liquid crystal layer held between the substrates, and transparent electrodes arranged to apply a voltage to the liquid crystal layer. The voltage application condition for the transparent electrodes is regulated by a voltage source (not shown) of the light deflector. At least one of the transparent substrates has an inner surface with a saw-tooth profile. The shape of the saw-tooth surface is determined so as to achieve a desired amount and direction of optical deflection. Since the orientation of the liquid crystal changes depending on the voltage applying condition, the liquid crystal molecules are regulated into the two states depicted by long ellipses and circles in FIG. 26A and FIG. 26B.

In this example, a homogeneously aligned chiral smectic C phase liquid crystal is used in the deflecting device. However, since any type of liquid crystal can be used as long as the orientation of the liquid crystal molecules and the index of refraction change according to the voltage applying condition, a nematic liquid crystal may also be used.

A pair of transparent electrodes are provided with the liquid crystal layer between them to apply an electric field in a direction perpendicular to the homogeneously aligned liquid crystal director (that is, in the direction of spontaneous polarization of the liquid crystal director).

Figure 26B:
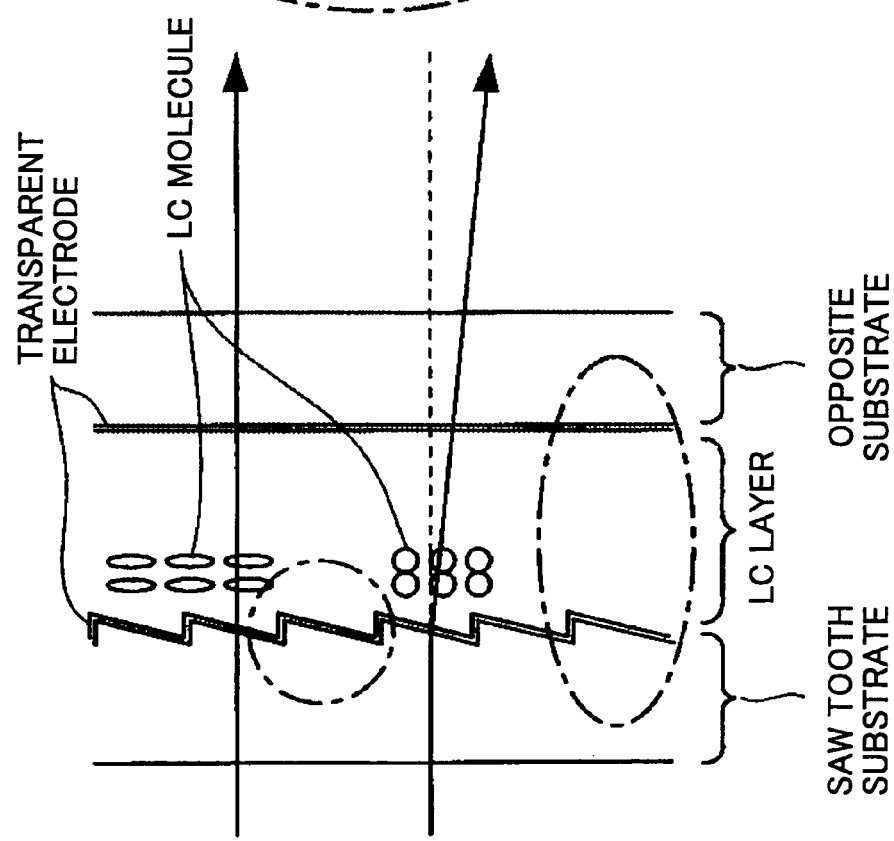

The saw-tooth substrate is formed so as to have a slope with an angle φ1 with respect to the normal to the incident light, as illustrated in FIG. 26B, FIG. 27A and FIG. 28.

FIG. 27B is a cross-sectional view taken along the A-A line shown in FIG. 27A. As illustrated in FIG. 27A and FIG. 27B, the liquid crystal director is oriented in one of the two directions (the first and second orientation) according to the direction of the electric field generated between the transparent electrodes.

By regulating the orientation of the liquid crystal director in one of the two orthogonal directions, as illustrated in FIG. 27B, the incident beam can be deflected efficiently.

When the incident beam is linearly polarized in the Y direction, a voltage is applied across the transparent electrodes to generate an electric field that causes the liquid crystal director to align in the Z direction (in the first orientation). In this state, if the indexes of refraction of the liquid crystal layer and the transparent substrates are the same, the incident beam behaves as an ordinary ray and passes through the deflecting device without deflection.

If the electric field is inverted to cause the liquid crystal director to align in the X direction (in the second orientation), the index of refraction of the liquid crystal layer differs from that of the transparent substrates. In this state, the incident beam behaves as an extraordinary ray and is deflected by the difference in index of refraction at the liquid crystal interface.

The index of refraction is one at the actually utilized temperature (e.g., from 10° C. to 60° C.) within the range of appropriate wavelength of visible light (e.g., 435 nm to 700 nm). The language "the indexes of refraction are the same" means that they are the same at a condition within the above-described ranges.

Aligning film (not shown) formed on the transparent substrates may be rubbed in the direction corresponding to the orientation of the liquid. The orientation of the liquid crystal molecule is strictly regulated depending on the rubbing direction. The aligning film is a conventional one, such as polyamide film used for TN liquid crystal or STN liquid crystal. It is preferable to perform rubbing or photo-alignment on the aligning film.

With the deflecting device shown in FIG. 26 through FIG. 28, the outgoing beam is rotated about the principal ray of the incident beam (which functions as the rotational axis) by regulating the orientation of the liquid crystal director.

Accordingly, a desired amount of deflection can be set by appropriately selecting the distance between the deflecting device and the observer.

To determine the beam direction in the deflecting device in a strict sense, indexes of refraction of the respective axes are determined from the orientation of the liquid crystal director with respect to the traveling direction of the incident beam and the indexes of refraction "no" and "ne" along the two axes, using the theory of an index ellipsoid. Then, based on the determined indexes of refraction, the deflecting direction is obtained. However, for the purpose of simplifying the explanation, it is assumed that the indexes refraction "no" and "ne" are switched depending on the orientation of the liquid crystal, and that the angle of deflection (representing the deflecting direction) is determined by applying Snell's law illustrated in FIG. 28.

The light deflector using the deflecting device shown in FIG. 26 through FIG. 28 is advantageous because a voltage is simply applied across the electrodes, and the light deflector is driven at a high rate at low power.

Figure 29:
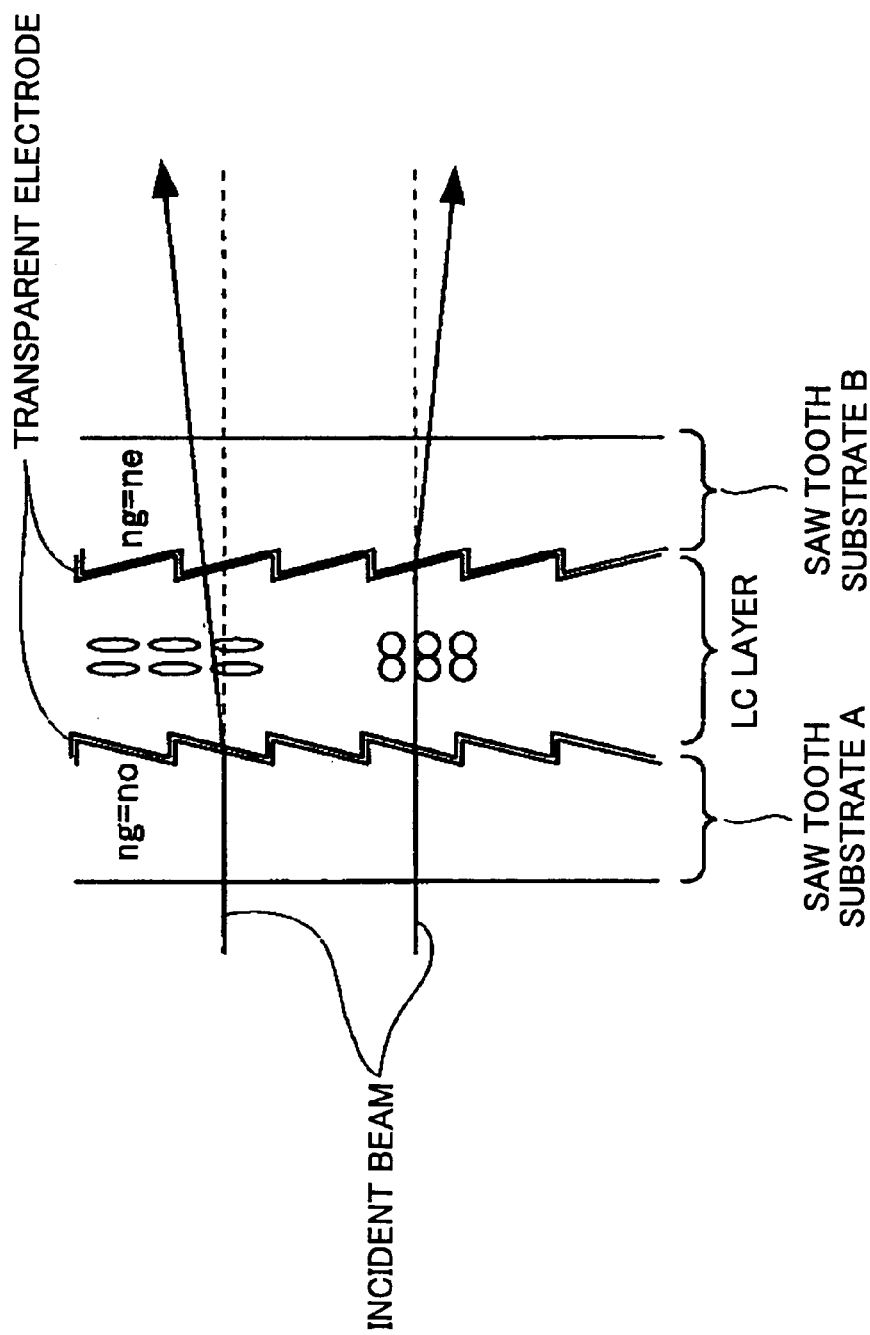
FIG. 29 illustrates another example of the deflecting device used in the light deflector of the multiview 3D image display apparatus according to the second embodiment of the invention.

FIG. 29 illustrates another example of the deflecting device used in the light deflector in the second embodiment. In this example, the inner surfaces of both substrates (denoted as saw-tooth substrate "a" and saw tooth substrate "b") have a saw-tooth profile. The slopes of the saw-tooth surfaces of the two substrates are arranged symmetric with respect to the liquid crystal layer. The index of refraction of one substrate (saw-tooth substrate "a" in this example) is set equal to the index of refraction "no" with respect to the ordinary ray, and the index of refraction of the other substrate (saw-tooth substrate "b" in this example) is set equal to the index of refraction "ne" with respect to the extraordinary ray.

The incident beam is linearly polarized in a direction parallel to the sheet of FIG. 29 by an oscillating electric field vector. If the linearly polarized beam is incident on the liquid crystal in which the major axis of the liquid crystal molecule aligns in the vertical (in the first orientation shown in FIG. 27B), the index of refraction differs at the interface between the saw-tooth substrate "a" and the liquid crystal, while the indexes of refraction is the same at the interface between the liquid crystal and the saw-tooth substrate "b". Accordingly, the incident beam is deflected at the interface between the saw-tooth substrate "a" and the liquid crystal layer, and passes straight through the interface between the liquid crystal layer and the saw-tooth substrate "b" maintaining the deflected direction.

On the other hand, if the linearly polarized beam is incident on the liquid crystal in which the major axis of the liquid crystal molecule aligns in the horizontal (in the second orientation shown in FIG. 27B), the index of refraction is the same at the interface between the saw-tooth substrate "a" and the liquid crystal, while the index of refraction differ at the interface between the liquid crystal and the saw-tooth substrate "b". Accordingly, the incident beam passes straight through the interface between the saw-tooth substrate "a" and the liquid crystal layer without deflection, and is deflected at the interface between the liquid crystal layer and the saw-tooth substrate "b".

The deflecting directions in the first state and the second state are symmetric with respect to the optical axis.

If the period of the saw-tooth surface does not correspond to the period of the image separation, the pixel line image to be perceived at each position may pass through the step of the saw-tooth. If the apex of the saw tooth is sharp, influence of the step of the saw tooth is negligible. However, it is difficult to make the apex of the saw tooth sharp, and in general, an apex has a certain radius of curvature.

For this reason, the step portion of the saw tooth may scatter the light, which may degrade the pixel image transmitted through the step portion. To avoid this problem, the period of the saw tooth is set so as to correspond to the image separation period of the image separator.

In the above-described example, the light beam is deflected by use of switching of the index of refraction. By appropriately selecting the indexes of refraction "no" and "ne" and the pitch and the height of the saw-tooth profile, a unidirectional diffracted light may be.selectively obtained. By making use of the diffraction, the orientation of the liquid crystal may be switched between the straight beam and the diffracted beam.

EXAMPLE 1

A silica grass substrate is dry-etched to form a saw tooth surface with a tilt angle of 0.5 degrees and a pitch of 500 µm. Then, an ITO is sputtered on the saw tooth surface up to a thickness of 2000 Å to form an ITO electrode. Then, the silica glass substrate with the ITO electrode is coated with polyamide aligning material AL3046 up to the thickness of 800 Å. The AL3046 layer is rubbed such that the homogeneously stabilized direction becomes perpendicular to the slope of the saw tooth surface. Another glass substrate with an ITO electrode having a flat surface is bonded to the silica glass substrate with the saw tooth surface using a bead-mixed adhesive, such that the smaller thickness of the liquid crystal layer becomes 1.5 µm. A ferroelectric liquid crystal (R5002 manufactured by Clariant) is injected by capillary phenomena such that the injecting direction is along the saw tooth shape. Then, the substrates are cooled from 77° C. to 55° C. under application of a DC voltage of 20 V/µm. Then, the glass substrates are sealed to accomplish the deflecting device illustrated in FIG. 6.

A voltage of ±10 V is applied to the deflecting device by a function generator. The input signal is a square wave signal, and the voltage value is measured by a tester. A white laser beam with a flux diameter of 1 mm is emitted toward the deflecting device. The wavelength of the incident beam is adjusted using a wavelength-selective filter (588 nm). A polarizing plate is inserted between the deflecting device and the laser to guide the linearly polarized beam onto the deflecting device having the saw tooth electrode. The direction of linear polarization is set to the ruling direction of the saw tooth electrode.

The transmitted light is observed by a CCD camera placed at 1 meter from the deflecting device, and deflection of the transmitted light is observed under application of a voltage.

<Observation of Three-dimensional Image>

Using the above-described deflecting device, a multiview 3D image display apparatus shown in FIG. 18 is fabricated. The light deflector using the above-described deflect is inserted between the lenticular lens array and the observation point. As the image display device, a direct-view liquid crystal panel (1024*768 pixels) is used. The pitch of the lenticular lens array is set to 1.6 mm, and the radius of curvature of the lenticular lens element is selected such that a three-dimensional image is observed about 2 m distant from the 3D image display apparatus. The separation between adjacent observation points (Ob. 1 through Ob. 4) is set to about 65 mm. The input image to the liquid crystal panel is generated by a method shown in FIG. 17. The cameras are positioned with an interval of 9 cm. The timing of the input signal to the liquid crystal panel and the deflecting device driving signal are controlled as shown in FIG. 20. When displaying an image while driving the deflecting device, a high-resolution 3D image was observed. When the viewpoint is moved, the 3D image can be observed from three observing locations.

EXAMPLE 1

A 3D image display apparatus shown in FIG. 13 is fabricated. The liquid crystal panel having the same resolution as that used in Example 1 is employed as the image display device. A left-eye image signal and a right-eye image signal are input to the liquid crystal panel to display the images. A lenticular lens array is used as the left and right image separator. The interval of the apertures of the lenticular lens array is about 0.2 mm. The separation between the liquid crystal panel and the lenticular lens array is 1.6 mm. When observing the image 1 m distant from the liquid crystal panel, a 3D image is observed. This 3D image is observed at only one location, unlike Example 1 where the 3D image is observed at three locations.

EXAMPLE 2

A 3D image display apparatus using two sets light deflectors illustrated in FIG. 21. The pitch of the saw-tooth surface of the deflecting device of the second light deflector (located closer to the observer) is set double, and the angle of deflection of the second light deflector is set half (½). The radius of curvature of the lenticular lens is adjusted such that a 3D image is observed at a farther position. The separation of eye views is set to 65 mm as in Example 1. The input image is generated using eight (8) cameras in the system shown in FIG. 17. Although the image display device is the same as that used in Example 1, a 3D image can be observed at four (4) more locations, that is, at seven (7) locations.

EXAMPLE 2

A 3D image display apparatus shown in FIG. 24 is fabricated. The input image used in Example 1 is again used in this example. In the. LCOS, a ferroelectric liquid crystal having a response speed of 1 ms or less is used. The images to be projected from this 1CCD projector/display are rewritten at a high rate. As a result, a clear 3D image at a higher resolution and less blurring, as compared with Examples 1 and 2, is observed.

EXAMPLE 4

The 3D image display apparatus used in Example 3 is used, and a microlens is incorporated in the LCOS as illustrated in FIG. 25. In an image projected from this 1CCD projector/display, each pixel on the screen is reduced, and therefore, ghosting is reduced during the 3D image reproducing process, and a 3D image with a further improved resolution is observed, as compared with Example 3.

In the second embodiment, a three-dimensional image is observed at multiple viewpoints without reducing the resolution even if the number of divided input images is increased. The resolution of the displayed 3D image can be improved with a simple structure.

This patent application is based on and claims the benefit of the earlier filing dates of Japanese Patent Application No. 2003-115766 filed Apr. 21, 2003, and Japanese Patent Application No. 2004-31072 filed Feb. 6, 2004, the entire contents of which are hereby incorporated by reference.

The invention claimed is:

1. A method for displaying a three-dimensional image comprising the steps of:
    generating a plurality of input images, each of the input images corresponding to one of multiple viewpoints including a right-eye position and a left-eye position of a viewer;
    allocating in a time dividing manner two or more of the input images to each of different image display regions of an image display device;
    switching said two or more input images at a certain timing to display one of said two or more images in each of the image display regions such that at a first timing a first of the input images is presented at a respective image display region, and at a second timing a second of the input images is displayed at the same respective image display region;
    separating light images, for right-eye position and for left-eye position, output from the image display regions from one another using an image separator positioned on a viewpoint side of the image display device; and
    switching a deflection direction of deflected light in synchronization with the first and second timing of presenting the two or more input images to deflect a light path of each of the light images emitted from the image separator toward a different respective of the multiple viewpoints synchronized with the switching timing such that the first image from the respective image display region is deflected to a first of the multiple viewpoints at the first timing and the second image from the same repective image display region is deflected to a second of the multiple viewpoints at the second timing.

2. A three-dimensional image display apparatus comprising:
    an image generator configured to generate multiple input images, each of the input images corresponding to one of multiple viewpoints including a right-eye position and a left-eye position of a viewer;
    an image display device positioned at a prescribed distance from the multiple viewpoints and having multiple different image display regions, two or more of the input images being allocated in a time dividing manner to each of the image display regions such that at a first timing a first of the input images is presented at a respective image display region, and at a second timing a second of the input images is displayed at the same respective image display region, the image display device being configured to switch said two or more input images at a certain timing to display one of said two or more input images in the associated image display region;
    an image separator positioned on a viewpoint side of the image display device and configured to separate light images, for right-eye position and for left-eye position, output from the image display device from one another; and
    a light deflector configured switching a deflection direction of deflected light in synchronization with the first and second timing of presenting the two or more input images to deflect, to deflect a light path of each of the light images emitted from the image separator so as to guide each of the light images to different respective of the multiple viewpoints such that a first image from the respective image display region is deflected to a first of the multiple viewpoints at a first timing and a second image from the same image display region is deflected to a second of the multiple viewpoints at a second timing.

3. The three-dimensional image display apparatus of claim 2, wherein each of said multiple image display regions has a width d, and the image separator is designed such that at least one of a shape, an index of refraction, and a transmissivity changes periodically at a pitch Ds defined by a product of L and d (Ds=L*d), in which L denotes a spatially dividing number representing a number of image display regions covered by a unit area of the image separator.

4. The three-dimensional image display apparatus of claim 2, wherein the number of directions of optical deflection caused by the light deflector is m, m being a number of input image data items allocated to each of the image display regions.

5. The three-dimensional image display apparatus of claim 2, wherein the number of input images is n, and n is a product of L and m (n=L*m), in which L denotes a spatially dividing number representing a number of image display regions covered by a unit area of the image separator, m being a number of input image data items allocated to each of the image display regions.

6. The three-dimensional image display apparatus of claim 2, wherein a deflection switching timing of the light deflector is synchronized with the switching of said two or more input images of the image display device.

7. The three-dimensional image display apparatus of claim 2, wherein the image is rewritten collectively at all pixels of the image display device.

8. The three-dimensional image display apparatus of claim 2, wherein the image display device is a projection-type liquid crystal display device having an aperture controlling part in a light bulb in order to restrict the size of a projected pixel at or under a pixel pitch.

9. The three-dimensional image display apparatus of claim , wherein the aperture controlling part is a microlens provided for each pixel.

* * * * *